(12) United States Patent
Bradbury et al.

(10) Patent No.: US 10,320,875 B2
(45) Date of Patent: Jun. 11, 2019

(54) CONTENT DELIVERY

(71) Applicant: British Broadcasting Corporation, London (GB)

(72) Inventors: Richard Bradbury, London (GB); Andrew Lipscombe, London (GB)

(73) Assignee: British Broadcasting Corporation, London (GB)

( * ) Notice: Subject to any disclaimer, the term of this patent is extended or adjusted under 35 U.S.C. 154(b) by 94 days.

(21) Appl. No.: 15/109,283

(22) PCT Filed: Dec. 23, 2014

(86) PCT No.: PCT/GB2014/053833
§ 371 (c)(1),
(2) Date: Jun. 30, 2016

(87) PCT Pub. No.: WO2015/101782
PCT Pub. Date: Jul. 9, 2015

(65) Prior Publication Data
US 2016/0323348 A1 Nov. 3, 2016

(30) Foreign Application Priority Data

Jan. 3, 2014 (GB) .................................. 1400094.7

(51) Int. Cl.
*G06F 15/16* (2006.01)
*H04L 29/06* (2006.01)
*H04L 29/08* (2006.01)

(52) U.S. Cl.
CPC ........ *H04L 65/605* (2013.01); *H04L 65/4076* (2013.01); *H04L 65/4084* (2013.01); *H04L 67/02* (2013.01)

(58) Field of Classification Search
CPC ............... H04L 65/605; H04L 65/4076; H04L 65/4084; H04L 67/02
(Continued)

(56) References Cited

U.S. PATENT DOCUMENTS

2005/0198097 A1* 9/2005 Kalnitsky ........... H04L 12/1859
709/200
2006/0047845 A1 3/2006 Whited et al.
(Continued)

FOREIGN PATENT DOCUMENTS

EP 2 665 261 A1 11/2013
EP 2 704 391 A1 3/2014
(Continued)

OTHER PUBLICATIONS

IPO Search Report for GB Appl. No. GB1400094.7 dated Jun. 26, 2014; 2 pages.
(Continued)

*Primary Examiner* — Wing F Chan
*Assistant Examiner* — Joseph R Maniwang
(74) *Attorney, Agent, or Firm* — Daly, Crowley, Mofford & Durkee, LLP

(57) ABSTRACT

A system for delivering content at varying qualities from a server to multiple client across a network has a server side converter and a client side converter. The server side converter makes unicast requests to a server for representations of content and converts these to multiple representations to be delivered as multicast streams. The client side converter receives a request for content from clients, determines a representation of content to obtain and subscribes to an appropriate multicast stream. The client side then converts the multicast stream back into segments available to a client by unicast request. In this way, data is delivered efficiently across a network from a server side to a client side while maintaining compatibility that client devices can issue traditional unicast requests.

21 Claims, 12 Drawing Sheets

(58) Field of Classification Search
USPC .......................................................... 709/219
See application file for complete search history.

(56) References Cited

U.S. PATENT DOCUMENTS

| | | | | |
|---|---|---|---|---|
| 2010/0153827 A1* | 6/2010 | Koster | ................ | H04L 12/1868 714/799 |
| 2011/0106961 A1* | 5/2011 | Glasser | ............... | H04L 67/1008 709/231 |
| 2013/0128889 A1* | 5/2013 | Mathur | ............... | H04L 12/1877 370/390 |
| 2013/0227158 A1* | 8/2013 | Miller | .................... | H04L 65/60 709/231 |
| 2013/0246578 A1 | 9/2013 | Moreman | | |
| 2013/0246643 A1* | 9/2013 | Luby | ................ | H04N 21/23439 709/231 |
| 2013/0254631 A1* | 9/2013 | Luby | ................... | H03M 13/356 714/776 |

FOREIGN PATENT DOCUMENTS

| | | |
|---|---|---|
| WO | WO 2012/000165 A1 | 1/2012 |
| WO | WO 2013/003793 A1 | 1/2013 |
| WO | WO 2013/056076 A1 | 4/2013 |

OTHER PUBLICATIONS

International Search Report of the ISA for PCT/GB2014/053833 dated Apr. 8, 2015; 3 pages.
International Written Opinion of the ISA for PCT/GB2014/053833 dated Apr. 8, 2015; 6 pages.

* cited by examiner

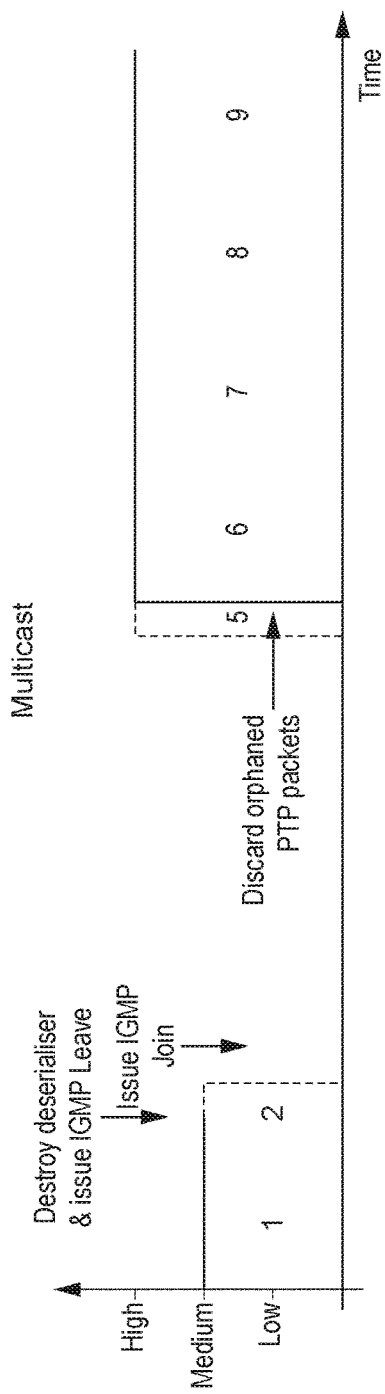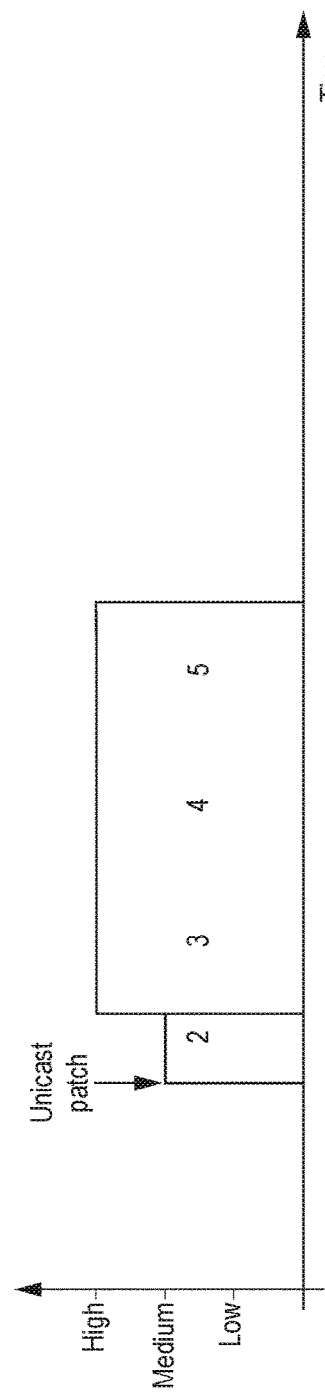

CONTENT DELIVERY

CROSS REFERENCE TO RELATED APPLICATIONS

This application is a U.S. National Stage of PCT application PCT/GB2014/053833 filed in the English language on Dec. 23, 2014, and entitled "CONTENT DELIVERY," which claims priority to United Kingdom application GB1400094.7 filed Jan. 3, 2014 which application is incorporated herein by reference

BACKGROUND OF THE INVENTION

This invention relates to a system and method for adaptive streaming of data.

Online delivery of audio-video content is known, based around IP unicast streaming and downloading to web-based clients, mobile handsets, set-top boxes and connected television sets. Recent developments in this area have seen first-generation proprietary streaming protocols replaced with a raft of (still proprietary) approaches to unicast streaming from different vendors converging on the HTTP application protocol. These include Microsoft Smooth Streaming, Apple's HTTP Live Streaming and Adobe's HTTP Dynamic Streaming. Another point of convergence is that these second-generation delivery technologies introduce the concept of Dynamic Adaptive Streaming whereby the same source media is encoded at a number of different bit rates and qualities. The client then switches dynamically between these different media streams as the media presentation progresses according to available network bit rate and playback conditions, thereby minimising adverse visible or audible effects.

Multicast streaming has been suggested as a means of reducing bandwidth across both ISPs and cache and origin access. Because of its logical similarity to broadcasting (one way transmission from source to viewer), it is less suitable for on-demand streaming, non-real-time downloading or the recently introduced concept of "live rewind". However, for live linear streams (e.g. a news channel) and for big events with high viewing figures (and therefore high unicast delivery costs) multicast offers an attractive technical solution for scaling provision to match audience demand.

SUMMARY OF THE INVENTION

We have appreciated the need to provide adaptive content delivery to multiple users whilst providing efficient use of network resources.

In broad terms, the invention provides additional functional components in a network to convert from unicast to multicast and back to unicast to provide seamless delivery to a client requesting unicast content but providing efficiencies of multicast transport. Systems and methods embodying the invention may be transparent in the sense that a server side converter and a client side converter are interposed between a conventional server and client such that the client and the server are both unaware of the conversion taking place and neither needs to be modified in order to take advantage of the efficiencies arising.

The invention is defined in the claims to which reference is now directed.

An embodiment of the invention effectively combines the technique of Dynamic Adaptive Streaming with multicast delivery. One reason for adopting multicast in this architecture is to ease network loading on both Internet Service Providers and HTTP edge cache infrastructure at times of peak live traffic. The embodiment applies an adaptive switching function that seamlessly switches between multicast media streams of different qualities (and therefore different bit rates) to match the dynamically changing capacity of the delivery network, in a manner similar to existing unicast adaptive streaming approaches. Furthermore, the embodiment provides for an automatic and seamless fallback to unicast operation in cases where reception of the multicast media streams proves unreliable or patchy. The architecture preferably provides the means to "plug in" a number of different client-side stream switching algorithms to facilitate the dynamic switching and to optimise the resulting media presentation.

BRIEF DESCRIPTION OF THE DRAWINGS

An embodiment of the invention will now be described in more detail by way of example with reference to the drawings, in which:

FIG. 8: shows bit rate against time when switching to a higher quality representation;

FIG. 9: shows a unicast request used when switching as in FIG. 8;

DETAILED DESCRIPTION OF THE PREFERRED EMBODIMENTS

The invention may be embodied in a method and system for processing audio video content and delivering across a network.

In order to provide context, some existing protocols will first be described.

MPEG DASH

An emerging technology standard for the next generation of IP media streaming services is MPEG DASH. The standard has been developed under the auspices of the Moving Pictures Experts Group (MPEG) with contributions from Microsoft, Apple, Adobe and 3GPP. The published specification [ISO/IEC 23009-1:2012] incorporates the best technical aspects of the proprietary technologies from which it is derived but, as a result, offers a number of different profiles and options. The variant of this technology that is used in the present disclosure uses HTTP-based delivery of fragmented MPEG-4 content [ISO/IEC 14496-14].

Dynamic Adaptive Streaming over HTTP (DASH) functions in a similar way to Microsoft Smooth Streaming and Apple's HTTP Live Streaming, presenting the media content as a sequence of short-duration Segments over (non-streamed) HTTP. The source media content is encoded at a variety of different bit rates—called Representations—and these are hosted on an HTTP server called a DASH server. A DASH client is then able to dynamically switch between Representations at the Segment boundary level by requesting Segments from a different Representation.

MPEG DASH is CODEC-agnostic and Segments may contain media in any format although both the ISO Base Media File Format [ISO/IEC 14496-12] and MPEG-2 Transport Stream [ISO/IEC 13818-1] are explicitly supported by MPEG DASH Profiles.

Figure 2:
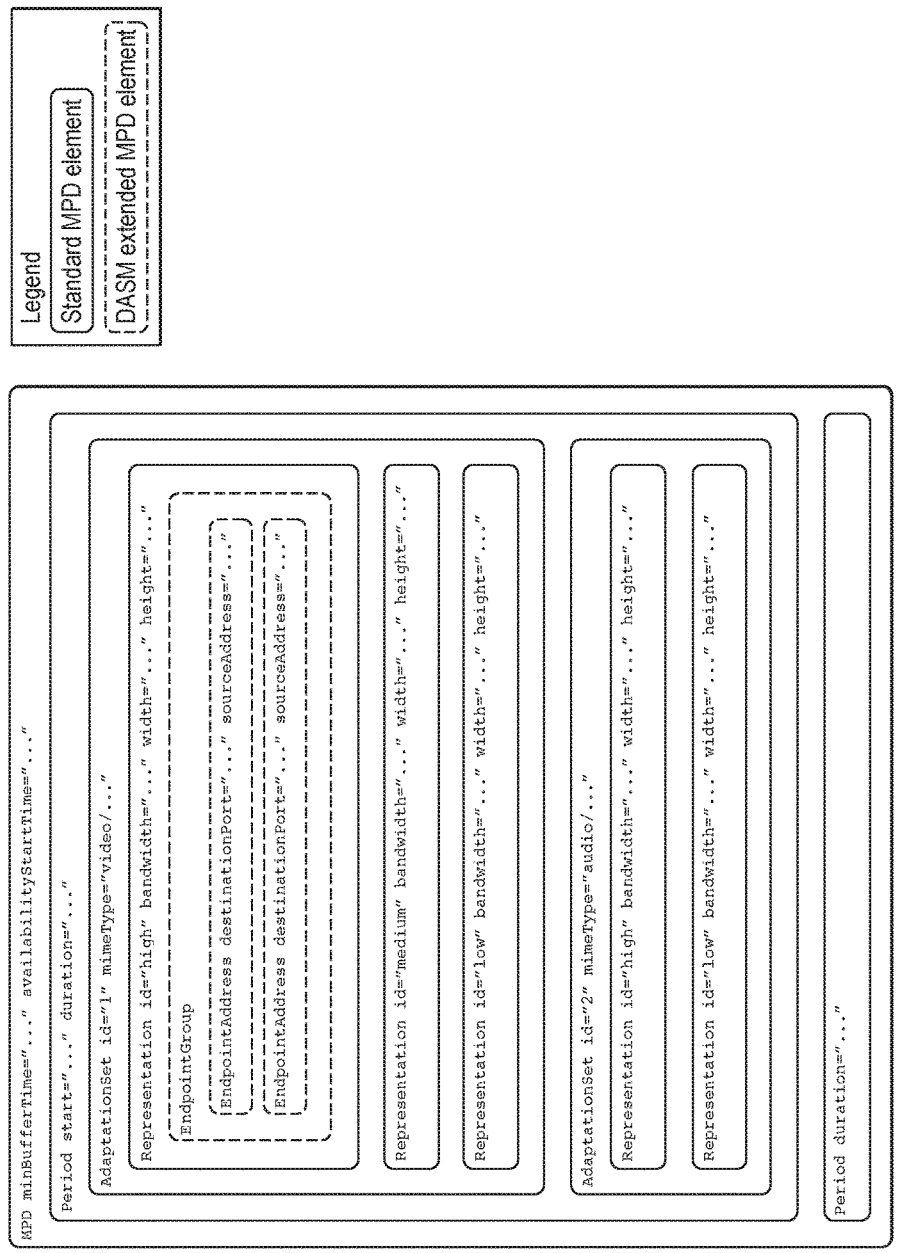
FIG. 2: shows an example Media Presentation Description (MPD)

A DASH media presentation is described by a "manifest" called the Media Presentation Description (MPD), depicted in FIG. 2. The media presentation is split into Periods of time. At any one time, only one Period in the media presentation is active and this is indicated by an absolute start time and/or a duration. Each Period contains one or more Adaptation Sets, each of which defines differently coded versions of the same source media called Representations. In some MPEG DASH profiles (e.g. the ISO Base Media File Format profiles) there is one Adaptation Set for each logical media stream in the presentation (e.g. video, main audio, audio description). In other MPEG DASH profiles (e.g. the MPEG-2 Transport Stream profiles) the logical media streams are multiplexed together into Adaptation Sets corresponding to fixed permutations of the available media streams. A Representation can therefore contain one media stream or, in the case of multiplexed media, many.

In operation, a DASH client first selects which Adaptation Sets in the current Period it is interested in rendering (e.g. choosing between a main programme audio Adaptation Set and an audio description Adaptation Set). As the media presentation progresses, the client then switches between the available Representations in its chosen Adaptation Sets.

Each Representation is divided into a sequence of temporal Segments. DASH Segments are made available by the DASH server as HTTP resources, each with its own unique Uniform Resource Locator. Thus, any available Segment can be retrieved by the DASH client by means of a simple HTTP GET request. Segments may be requested whole. Alternatively, they can be requested in part using a so-called "byte range" request. In order to support Representation switching by the DASH client the Segment boundaries in all Representations belonging to the same Adaptation Set are preferably aligned. The Segment boundaries of different Adaptation Sets do not need to be aligned, however. Typically, all Segments in a particular Representation have the same duration, which can range from a few seconds to the whole duration of the Period.

At the start of reception of each Representation, an Initialisation Segment is typically downloaded. This can be thought of as a header, containing information about the encoding, frame sizes, etc. A DASH client needs to obtain this for a given Representation before it can decode media Segments from that Representation.

Profiles in MPEG DASH typically impose restrictions on features of the Media Presentation Description and on Segment formats, but may also control media formats and CODECs or encoding parameters such as bit rate and sample resolution. The preferred profile used in this disclosure is the ISO Base Media File Format Live Profile. This profile is intended for live encoding and can achieve a latency of only a few seconds by the use of short duration Segments. The URLs of Segments are specified in the MPD using a simple template format so it is not necessary for the DASH Server to append new entries to the MPD as the live media presentation progresses and it is not necessary for the DASH Client to fetch a new copy of the MPD before requesting the next Segment. Segments are constrained so that the client may always switch Representations at Segment boundaries and seamless switching is therefore possible provided a client has downloaded, decoded and presented the "come-from" Representation before processing the "go-to" Representation.

System Overview

A system embodying the invention will first be described in relation to FIG. 1, followed by greater detail of message flows in relation to subsequent figures.

Figure 1:
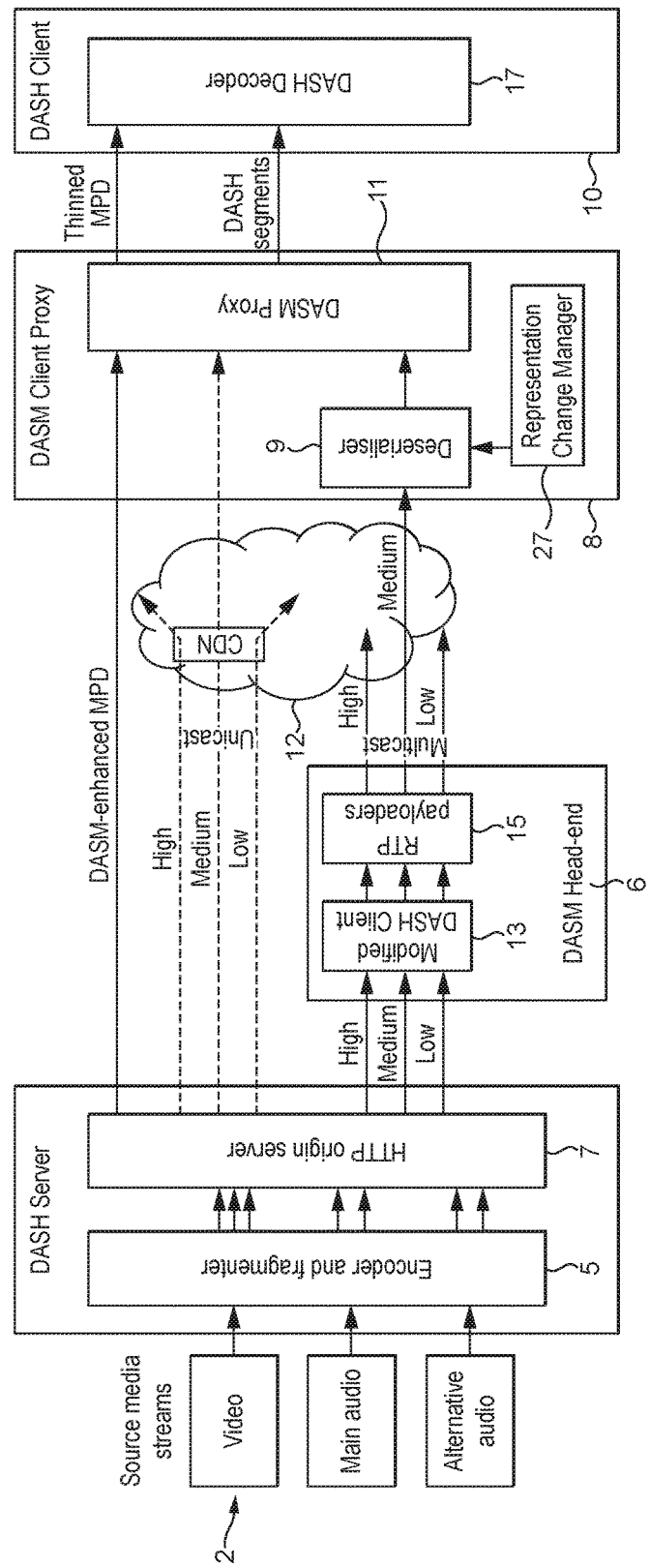
FIG. 1: is a schematic diagram providing an overview of an end to end system embodying the invention.

An advantage provided by the system of FIG. 1 is that it is able to deliver live DASH content over multicast streams, and to maintain the adaptive nature of the DASH system. We will refer to this technique as Dynamic Adaptive Streaming over Multicast (DASM). The embodying system delivers content across a network using multicast streams which will be referred to as datagram streams using the word "datagram" in its conventional generic sense.

The system is designed primarily for live streams, rather than on-demand content, and the system preferably uses an MPD that describes content using the ISO BMFF Dynamic Live Profile. In addition, Segments are preferably packaged in such a way that the majority of decoder initialisation information is repeated at the start of every media Segment and a common Initialisation Segment containing vestigial initialisation information is shared by all Representations comprising a particular Adaptation Set. An example of this is the "avc3" sample entry format [ISO/IEC 14496-15:2008 Amd 2] applied to H.264 video [ISO/IEC 14496-10]. This approach to media packaging enables the "thinning" technique described later in which a proxy presents a single Representation to the decoder comprising Segments selected from the different Representations made available by the DASH Server.

FIG. 1 shows the logical system blocks of a DASM end-to-end chain, from source media streams through to the client decoder. Three source media streams 2 are depicted in this example: video, main audio and alternative audio. (For reasons of clarity, the figure only shows onward distribution of the video Adaptation Set from the Origin Server, although in reality all Adaptation Sets would be distributed.)

The chain starts with the encoding, fragmentation and packaging of the source media streams using an encoder and fragmenter 5 within a DASH server 4, for example using the MPEG-4 "avc3" sample entry format and MPEG DASH ISO Live profile. Each source media stream is encoded at a range of bit rates ("high", "medium" and "low" bit rate video as shown in FIG. 1) and the Representations arising from that source media stream are grouped into an Adaptation Set. The encoded MPEG DASH Segments are hosted on a standard HTTP server 7 within the DASH server 4, perhaps feeding into a Content Delivery Network (CDN) HTTP infrastructure 12. This is a standard DASH Server system. At the far end of the chain, a standard DASH Decoder consumes these standard DASH Segments within a DASH client 10.

Between the standard DASH server and DASH client components are interposed a server side converter 6 referred to as DASM Head-end system and one or more client side converters 8 referred to as DASM Client Proxy systems. The server side converter 6 and client side converter 8 together provide the new arrangement by which conversion between unicast and multicast is achieved.

The DASM Head-end system 6 implements a simplified MPEG DASH client 13 that simultaneously retrieves Segments of all Representations from all Adaptation Sets in the current Period at the appropriate time. These are passed into a set of serialising components 15 (RTP Payloaders), one per Representation, that fragment each DASH Segment into a sequence of RTP packets. The packets produced by each RTP Payloader are then transmitted in multicast UDP/IP datagrams, with the transmission of these datagrams spread evenly across the duration of the Segment (a time value defined within the MPD). This ensures a reasonably even bit rate for the resulting multicast stream. The multicast destination address targeted by each RTP Payloader is specified separately for each Representation in the Media Presentation Description using the extensions to the XML schema depicted in FIG. 2. This enhanced MPD is then made available to instances of the DASM Client Proxy by publishing it, for example to an HTTP server. The implementation of the DASM Head-end is further described later.

The DASM Client Proxy system 8 combines a deserialising function 9 for receiving DASM-formatted RTP multicast packets with an HTTP client 11 for retrieving DASH Segments directly from the DASH Server using the standard DASH unicast retrieval method. The detailed operation of the DASM Client Proxy is described below. An important feature to note is that there is no rate adaptation on the multicast streams output from the head-end—this is done entirely at the client end.

Transport Protocol

An example transport protocol based on the RTP Advanced Video Profile is used by the RTP Payloaders 15 and deserialising function 9. DASH Segments are split into chunks of a size suitable for inclusion in the payloads of RTP packets. Reassembly metadata is conveyed by profiling the use of specific fields in the RTP packet header to indicate the first and last packets corresponding to a particular DASH Segment. The presence of the RTP extension header bit ("X") indicates the start of a Segment transmission and the marker bit ("M") indicates the end. The packet ordering is also conveyed in the RTP packet header to facilitate reassembly of the original DASH Segment in the case where RTP packets arrive out of order at their destination because they have followed different network paths. Metadata about the DASH Segment, such as its number, is conveyed in the RTP extension header. The RTP payload format is fully specified in Appendix A.

Forward Error Correction

An additional benefit provided within the system is the ability to use adaptive Forward Error Correction (FEC). The DASM Head-end system 6 is able to generate additional multicast streams carrying FEC information (e.g. Pro-MPEG COP3) as protection against persistent random bit errors. These FEC streams are advertised in the Media Presentation Description (MPD) alongside the RTP multicast streams and the Client Proxy is able to subscribe to them in addition to the RTP multicast group.

This technique is especially useful for protocols such as RTP in which the underlying transport protocol (in this case UDP) offers limited protection of the datagram payload integrity. In the extreme, a two-dimensional FEC scheme may be configured to enable entire RTP packets to be reconstituted following loss in the network. The use of Forward Error Correction is a trade-off between FEC overhead and prevention of the need for unicast fetching.

Client Architecture

Figure 3:
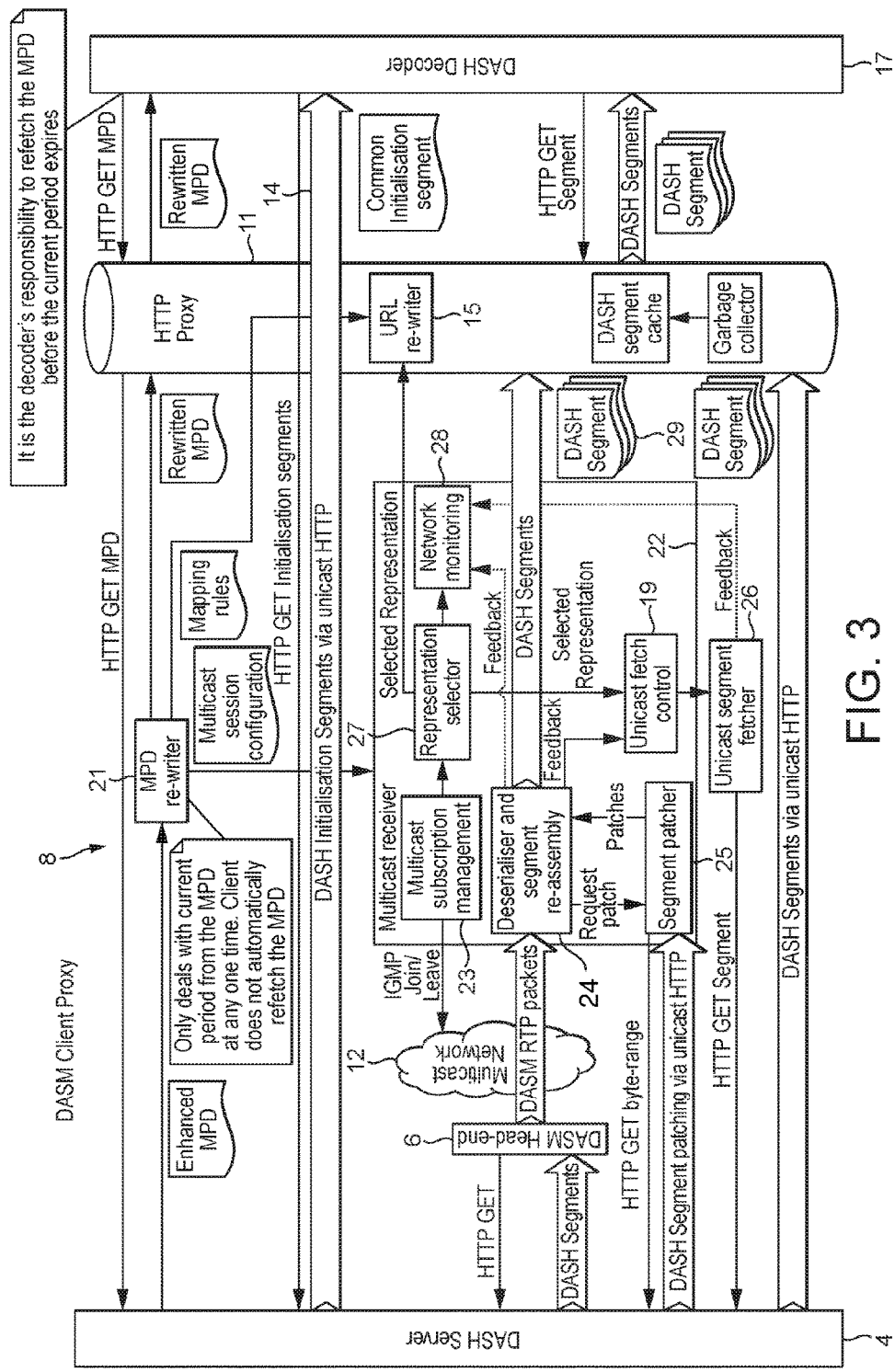
FIG. 3: is a schematic diagram showing the client side converter of FIG. 1 in greater detail.

FIG. 3 shows the software blocks that make up the embodying DASM end-to-end system, with a particular emphasis on the receiver end of the chain. The end-to-end system comprises a DASH server 4 operable to provide unicast content as previously mentioned. This provides content as DASH segments to a DASM server 6 which formats them into RTP packets suitable for multicast distribution by a network 12.

On the receiver side, a conventional DASH Decoder 17 is arranged to retrieve and decode DASH segments. The DASM Client Proxy 8 is the component that will now be described in greater detail. The DASM Client Proxy system 8 consists primarily of an HTTP proxy 20 that intercepts all content requests from the DASH Decoder 17. Note that the DASM Client Proxy 8 is a logical system block that sits between the DASH Server 4 (on the far left) and DASH Decoder (on the far right); when there is no multicast Live DASH stream content, the DASM Client Proxy is inactive and effectively "out of circuit".

The functioning of the Client Proxy is as follows.

Firstly, the Client Proxy 8 intercepts all requests for MPD resources made by the DASH Decoder 17. If the MPD returned by the origin server 7 does not contain any multicast addresses (in the format described in Appendix B) it is returned to the Decoder unmodified by an MPD re-writer 21. The DASM system remains inactive, with the Decoder 17 functioning in adaptive unicast DASH mode as normal. However, if the MPD contains DASM multicast addressing extensions the Client Proxy 8 re-writes (or "thins") the MPD in the MPD re-writer 21 in such a way that there is only one Representation per Adaptation Set. The thinning process rationalises the elements and attributes of the original MPD to remove duplication and intentionally insert ambiguity. (The transformation rules for re-writing the MPD are listed in Appendix B.)

The Decoder 17 "sees" only one Representation for each Adaptation Set in the thinned MPD it receives, yet the Segments subsequently delivered to the Decoder by the Client Proxy 8 could be from any of the available Representations in the original MPD, at any bit rate or resolution. This aspect of the embodiment relies on the use of an Initialisation Segment that is common to all Representations, which is the case with the "avc3" sample entry format of H.264 video, for example.

Secondly, for each Adaptation Set in the currently active Period, the Client Proxy subscribes to the multicast address of the most appropriate Representation for the current network conditions, and re-assembles the received RTP packet payloads back into the original DASH Segments 29 using a Deserialiser module 24. The subscription to a multicast address is performed by a multicast receiver component 22. The multicast receiver 22 includes a subscription management module 23 and Representation selector module 27 which together allow the multicast receiver 22 to select and subscribe to the most appropriate multicast Representation for each Adaptation Set based on the prevailing network conditions experienced by the Client Proxy 8. A network monitoring module 28 receives feedback by analysing the performance of a unicast segment fetcher 26 as well as information received from the Deserialiser 24 that receives the RTP packets of the currently subscribed multicast group(s). Completed Segments 29 presented on the output of the Deserialiser module 24 are stored in a Segment Cache forming part of the HTTP Proxy component 17 from where they are made available to the Decoder 17. Because multicast datagram reception may not start immediately, unicast fetching may be required to populate the Segment Cache with whole Segments at the very start of the media presentation session and when the Client Proxy decides to switch to a different Representation. Initialisation Segments 14 are always fetched via unicast. Furthermore, any RTP packet loss detected by the Deserialiser module 24 during multicast reception is "patched" by means of unicast byte-range HTTP GET requests using a unicast segment patcher module 25. This patching is described in greater detail later.

Thirdly, the Client Proxy configures a set of URL re-mapping rules in the URL re-writer module 15 of the HTTP Proxy component 11 for the media presentation session in question. The URL templates in the MPD returned to the Decoder are manipulated in such a way that the host part is converted into a local host name (for example, http://dasm.local/ . . . ) corresponding to the Client Proxy's Segment Cache 20. This arrangement allows the Client Proxy to ensure that Segments are preferentially served to the Decoder from local cache (fed by multicast) and unicast fetching is only employed as a fallback in the case of a cache miss due, for example, to multicast reception failure. The local URLs passed to the Decoder 17 retain enough context to allow the Client Proxy to identify the particular media presentation, Session and Adaptation Set of interest to the Decoder. This enables a single Client Proxy to manage multiple different media presentation sessions simultaneously. It also enables the Client Proxy to service multiple Decoders requesting the same media presentation at the same time with a low overhead. The Representation selector module 27 maintains the state of which Representation is current for each Adaptation Set and can thus reconstruct the original DASH URL for any Segment requested that cannot be located in the Segment Cache of the HTTP Proxy 11. Missing Segments can then be fetched from the DASH Server 4 using the Unicast segment fetcher 26 under the direction of the Unicast fetch control module 19.

Fourthly, the starting time of the media presentation signalled in the original MPD (the "availability start time") is manipulated by the MPD Rewriter 21 as it passes through the Client Proxy on its way to the Decoder. This gives the Client Proxy the opportunity to introduce an artificial delay in the media presentation. This is important in giving the Client Proxy 8 additional time to receive and reassemble multicast RTP packets into the original DASH Segments before the Decoder requests them. The additional delay that this time manipulation introduces into the end-to-end system is a price paid for the increased scalability.

Client Proxy Sequence of Operation

Figure 4:
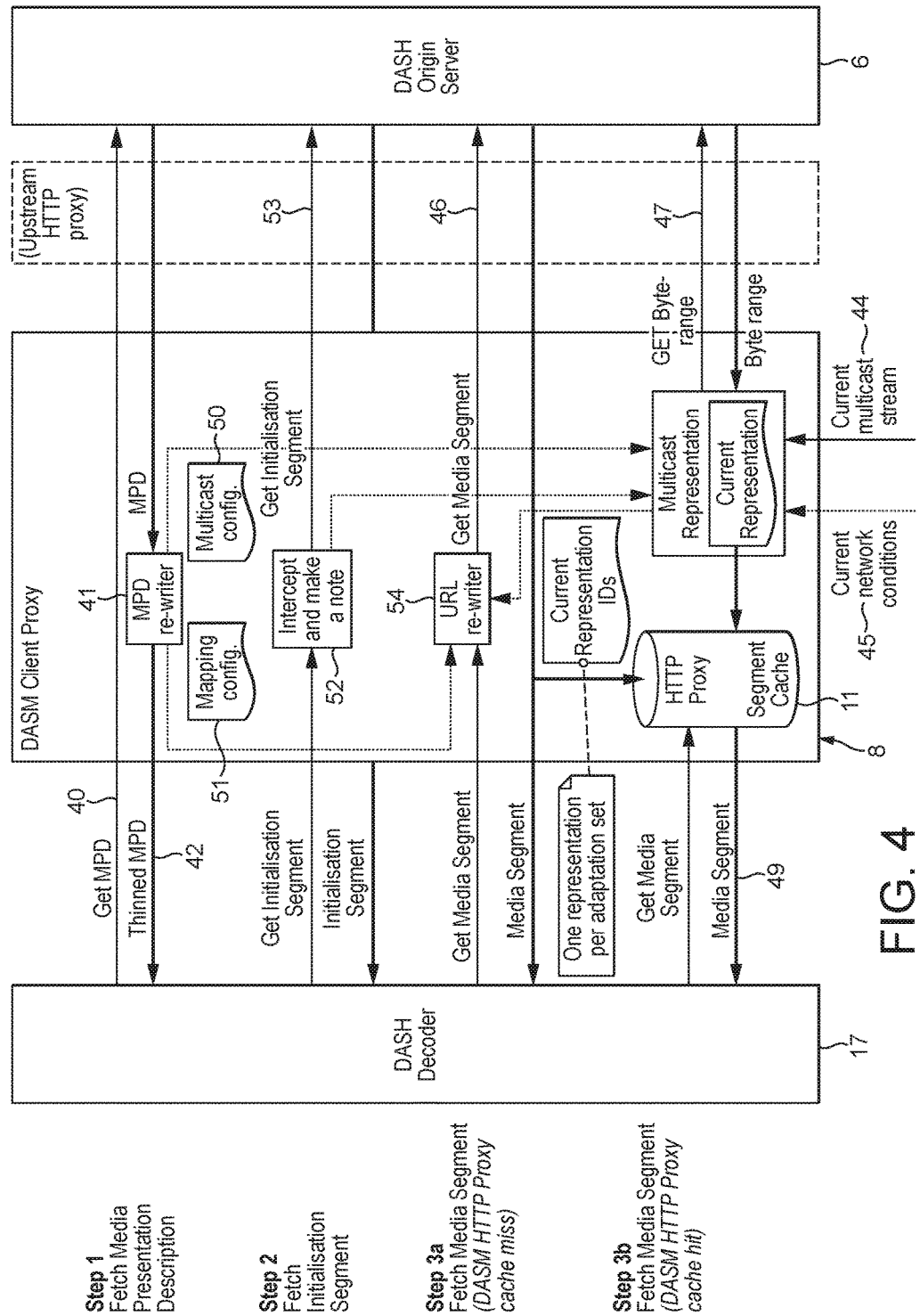
FIG. 4: shows the message flow as handled by the client side converter.

FIG. 4 shows the message flow as handled by the Client Proxy 8.

Step 1. Fetch MPD: The DASH Decoder requests an MPD 40, and the request is passed by the DASM Client Proxy to the DASH Server. However, the returned Media Presentation Description (MPD) is intercepted by the Client Proxy and analysed by the "thinning process" 41. If multicast endpoint addresses are present, the MPD is "thinned" before returning it to the Decoder 42. Each Adaptation Set is reduced to a single synthetic Representation with a URL template of the form http://dasm.local/<sessionID>/<availabilityStartTime>/<AdaptationSetID><Segment ID> instead of pointing at the original DASH Server. The information contained within the MPD is also stored within the Client Proxy as multicast configuration 50 for the media presentation session and mapping configuration for the current Period 51. Otherwise, the MPD resource is returned unmodified to the DASH Decoder.

Step 2. Fetch Common Initialisation Segment: When the Decoder requests the Initialisation Segment for the synthetic Representation of an Adaptation Set within the "thinned" MPD, the Client Proxy interprets 52 this as the start of the media presentation Session and instructs the Multicast Receiver component 22 to subscribe to the multicast stream corresponding to the currently selected Representation for the Adaptation Set in question. The Common Initialisation Segment is returned unmodified to the Decoder 53.

Step 3. Fetch Media Segment: Because the modified MPD passed to the Decoder has been rewritten to contain only local URLs of the form http://dasm.local/ . . . all Segment requests 49 are intercepted by the Client Proxy 8.

Step 3a. Fetch Media Segment (Cache miss case): If the requested Segment is not present in the Segment Cache of the HTTP Proxy because the Segment has not been received via multicast (for example, in the case where the Client Proxy is waiting for the first multicast Segment to appear at the start of a media presentation session, or immediately after switching to a different multicast Representation) the URL re-writer module 54 uses the identity of the currently selected Representation combined with the previously stored mapping configuration 51 to map the local URL to the original Segment origin URL. This external URL is then used by the Client Proxy in a unicast fetch of the whole DASH Segment, which is returned to the decoder, and also cached in the Segment Cache of the HTTP Proxy 11.

Within the Client Proxy 8 there is a clock (the "Segment Clock") which drives the deadline for availability of Segments. It is derived from the Multicast Receiver for each Representation (the Deserialiser 24) and the duration of Segments within each Representation (carried as metadata in the MPD). If a defined deadline (before the decoder is expected to ask for a Segment) is reached without the Multicast Receiver delivering the next Segment, the unicast fetch control module 19 will request the whole Segment via the unicast segment fetcher 26 to avoid this cache miss case.

Step 3b. Fetch Media Segment (Cache hit case): This is the case where a request from the Decoder for a DASH Segment 49 can be served from the Segment Cache of the HTTP Proxy 11. in this, the preferable case, the requested Segment has already been placed in the cache by the Multicast Receiver 22 as described above, with any missing portions of the Segment patched by means of a byte range unicast HTTP GET request 47.

The DASH Decoder sees just one Representation for each Adaptation set in the manipulated MPD. Depending on the choices made by the Representation selector module 27, each Segment delivered to the Decoder could be from a different Representation with a different resolution or bit rate. To achieve a smooth and consistent viewing experience the system relies on the Decoder being able to decode each Segment as an individual entity, and not relying on the metadata provided by the MPD file. One way of achieving this in the case of H.264 video is the use of the "avc3" sample entry format and a Common Initialisation Segment that is the same for all Representations in a given Adaptation Set.

Segment Cache Retention Policy

As a particular media presentation session progresses the Segment Cache of the HTTP Proxy 11 will tend to fill up with Segments. The DASM Client Proxy may provide a Garbage collector module that automatically limits the size of the Segment Cache by deleting old Segments. Segments will typically be deleted in the same order that they were received, but this need not be the case. This Garbage collector may be aggressive, removing Segments soon after their presentation time, or it may deliberately allow Segments to remain in the cache for an extended period. By retaining Segments for a short time, the Client Proxy can efficiently service a number of Decoders that are all consuming the same media presentation at approximately the same time. This scenario is typically the case for live viewing. By retaining Segments for longer period, the Client Proxy can service requests to "rewind" the media without recourse to the DASH Server resulting from a cache miss. The longer the Segment retention period, the longer the rewind buffer available for a particular media presentation.

Client Side Converter Deployment

Figure 5:
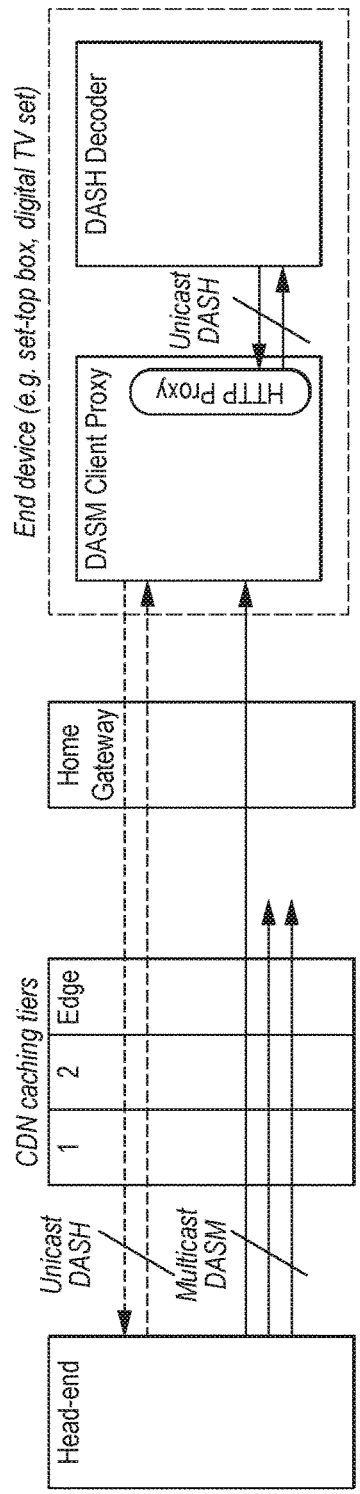
FIG. 5: shows an implementation of the client side converter at a client device.
Figure 6:
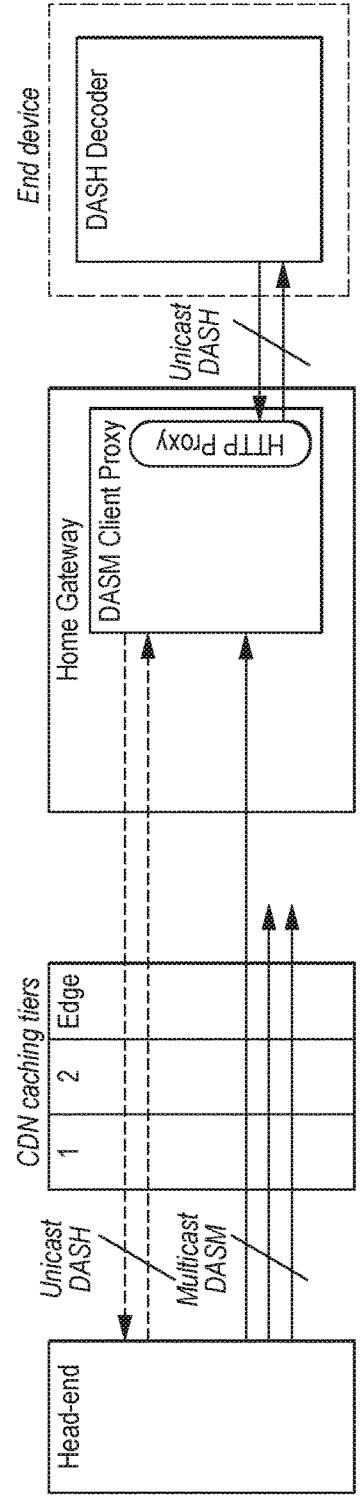
FIG. 6: shows an implementation of the client side converter at a home gateway device.
Figure 7:
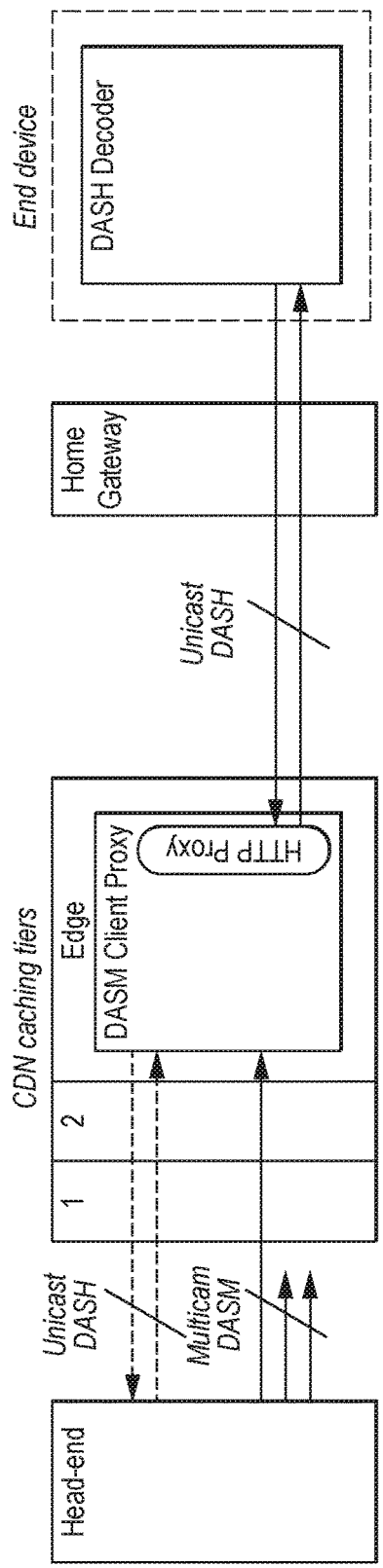
FIG. 7: shows an implementation of the client side converter at a network delivery device.

The client side converter in the form of the DASM Client Proxy 8 could be deployed in at least three different ways, all within the scope of the embodiment, as shown in FIGS. 5, 6 and 7.

FIG. 5 shows a variation in which the Client Proxy is co-located with the Decoder. In this deployment scenario the Client Proxy sits alongside the Decoder as a logical module embedded within a set-top box, integrated television receiver or similar device. The Decoder must be explicitly configured to use the Client Proxy for all HTTP requests so that MPD requests can be intercepted and the "thinned" MPD returned to the Decoder and so that all requests for Segments are also redirected to the Client Proxy.

FIG. 6 shows a variation in which the Client Proxy is integrated with a Home Gateway device. For domestic properties and offices where there are potentially many viewing devices accessing different media presentations simultaneously, it may be appropriate to deploy the Client Proxy in the Home Gateway device. Some Home Gateway routing devices do not, by default, pass multicast traffic into the home network, either by design or through configuration by the Internet Service Provider that has supplied and provisioned the Home Gateway. This variation delivers multicast datagrams as far as the Home Gateway, but not directly to devices in the home network.

The Home Gateway is ideally placed to intercept requests from individual DASH Decoders and implement the DASM Client Proxy function transparently for all of them. The loss of efficiency by not carrying multicast traffic within the home network may be offset by the increased operating convenience to the ISP. By retaining Segments in a small cache located in the Client Proxy for a short period of time, the same live media presentation can be viewed near-simultaneously by multiple Decoders with very little overhead.

FIG. 7 shows a variation in which the Client Proxy function is implemented within an ISP network device. Similarly to the previously described variation, multicast traffic might not be enabled by the Internet Service Provider on subscriber lines between the DSLAM and the Home Gateway. In this, or similar cases, the DASM Client Proxy function could be deployed within the Internet Service Provider's network at a point that is most amenable to the Internet Service Provider's traffic management requirements. FIG. 7 illustrates one such deployment of the DASM Client Proxy at the edge of the network so as to take best advantage of multicast transmission through the ISP's core network. In other variations the Client Proxy is deployed progressively closer to the Head-end system with the region of the network carrying multicast traffic becoming correspondingly smaller as a consequence.

Reception Operation

Subscription to a multicast stream is achieved by the receiving subsystem, for example the Deserialiser module 9 within the DASM Client Proxy 8, issuing an IGMP Join message [IETF RFC 3376] to its gateway router. Because the IGMP message needs to propagate through the network 12 to the nearest multicast rendezvous point, there are no guarantees of when the first RTP packets will be routed back through the network and received by the Client Proxy. Furthermore, the first RTP packet received has only a 1 in N chance (where N is the number of RTP packets that makes up the original DASH Segment) of conveying the start of a new Segment, and therefore containing the essential RTP header fields to initiate reassembly of RTP packets into DASH Segments. The first part of the multicast reception strategy is therefore to expect at least the first Segment to be delivered to the Segment cache by unicast fetching. This occurs for all selected Adaptation Sets at the start of a new media presentation session and subsequently whenever the Representation is changed for a particular Adaptation Set during the session.

When the Representation selector module 27 decides to terminate reception of a particular multicast stream, an IGMP Leave message is issued to the gateway router and there then follows an unknown period between the request being issued and the actual cessation of RTP reception on the network link. In order to prevent an overlap of datagrams that a part of the previous stream and those of the next stream (and hence saturating the network link), the second part of the multicast reception strategy is to build in an artificial delay between the two multicast streams (of the order of a few seconds, which equates to one or more DASH Segments). This gap will be filled in using unicast fetching and patching as appropriate. The DASM Client Proxy may tune the length of this delay during the course of a media presentation session to suit the network configuration by learning about the latency with which IGMP messages are acted upon.

Changing Representation

A particular feature of an embodiment of the invention is the ability to detect the need for changing from one Representation to another based on prevailing network conditions. Referring again to FIG. 1 for ease of reference, the Client Proxy 8 may detect that there are adverse network conditions and so select a lower multicast Representation to present to the end client 10. This is achieved in a manner that is transparent to the end client 10. The DASH Client 10 simply receives Segments of the currently selected Representation from the Client Proxy 8 using unicast requests and responses and so is unaware of changes of Representation occurring.

The changing from one Representation to another is best understood with respect to FIGS. 8 to 13 showing schematically multicast and unicast Segments against time.

Responsibility for changing Representation lies with a logical component of the Client Proxy 8 called the Representation selector 27, the implementation of which is more fully described later.

FIGS. 8 to 13 show the benefits provided by the Client Proxy 8 handling the conversion between unicast requested by the client and multicast received over the network. In addition, processes are described by which unicast segments may be used when beginning or ending subscription to a multicast stream, or when switching between multicast streams of differing qualities. The processes set out in relation to FIGS. 8 to 13 are undertaken by the Representation selector 27.

The decision to change up to a higher bit rate representation may be made by the Representation selector if detailed network conditions suggest that there is no issue with the previously selected multicast stream fitting into the available network capacity. Such a situation is shown by the flat and even reception of Segment 1 at the left hand side of FIG. 8. Consequently, after leaving the current multicast group, all RTP packets received so far for the next Segment are usable, and if the RTP packets cease before the last packet of this Segment is complete (Segment 2 in the figure), the arrangement completes the missing portions by means of a unicast byte-range patch (the remaining section of Segment 2 in FIG. 9). The process for smoothly leaving one multicast stream may therefore be summarised as issuing an IGMP Leave request, determining whether complete Segments have been received and, if the delivery of packets ceases before the last packet is complete, issuing a specific request for the missing part of that Segment, in this example by using a byte range request. In this way, the Client Proxy may cleanly leave one multicast stream.

The Representation selector 27 determines an appropriate higher bit rate stream to join and issues an IGMP Join request. The process of joining the new multicast group may therefore be summarised by the steps taken by the Client Proxy of issuing a Join request to join a multicast stream, determining if any initially received Segments are incomplete and, if so, discarding packets of an incomplete Segment and, instead, retrieving these by a unicast request. As seen in FIG. 9, the result is that a partially received Segment (Segment 2) received by multicast is completed by a patch request so that missing portions are requested by unicast to complete that Segment. Note that the unicast Segment is requested at the original (lower) bit rate in order that any network congestion arising is minimised. Subsequent Segments that are not received (at all or partially) are retrieved by unicast until the new multicast stream is established. The new multicast group is joined (here using IGMP Join) but, in this example, RTP packets do not start arriving until part way through Segment 5 (see FIG. 8 again). Consequently, Segments 3, 4 and 5 are missing. The Multicast receiver 22 determines this fact and acquires the missing segments for the DASM Client Proxy using a DASH unicast fetch. The final packets of Segment 5 arriving by multicast (shaded zone of Segment 5 in FIG. 8) must be discarded because the initial metadata has not been received via multicast.

Figure 10:
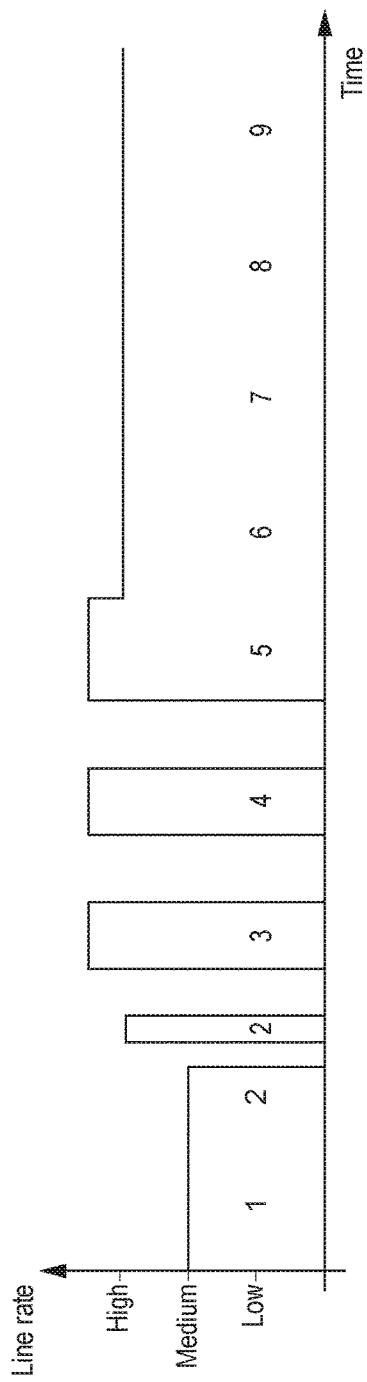
FIG. 10: illustrates the slightly higher bit rate generated during the unicast fetching of FIG. 9.
Figure 11:
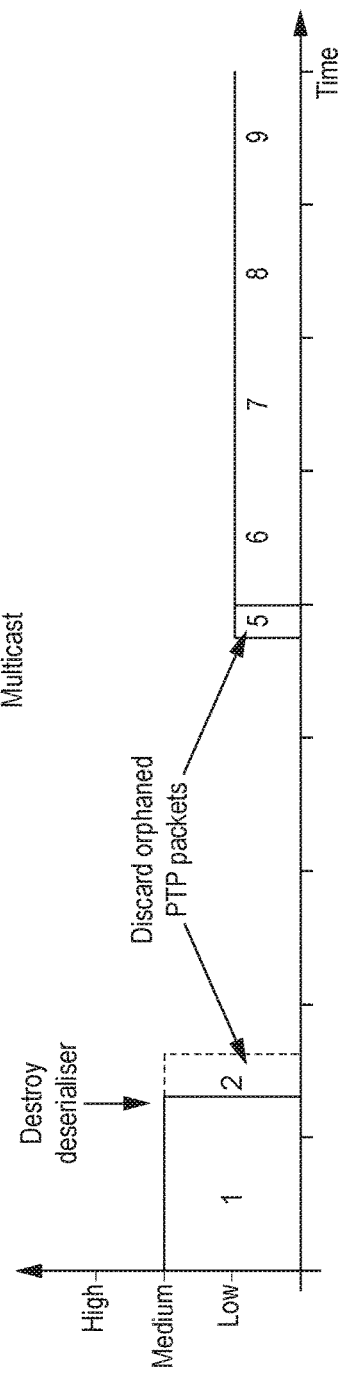
FIG. 11: shows bit rate against time when switching to a lower quality representation.

FIG. 10 illustrates the slightly higher bit rate generated by the Client Proxy during the unicast fetching of Segments 3 and 4, and also the start of Segment 5 due to TCP windowing which will typically burst up to available line rate. The multicast delivery (Segments 6 onwards) needs to sit slightly lower than this line rate to guarantee efficient delivery via multicast alone. (In reality the difference between the peak unicast rate and the achievable multicast rate may be much smaller than shown, or even negligible, depending on actual network conditions.)

Also note that the completion of Segment 2 is achieved via unicast "burst"—this may also happen at the same rate as 3, 4 and 5 and is only shown at a slightly lower rate in the figure to differentiate between the patching of a Segment that has been partially received already via multicast (Segment 2) and the fetch of a whole Segment (Segments 3 and 4).

Figure 12:
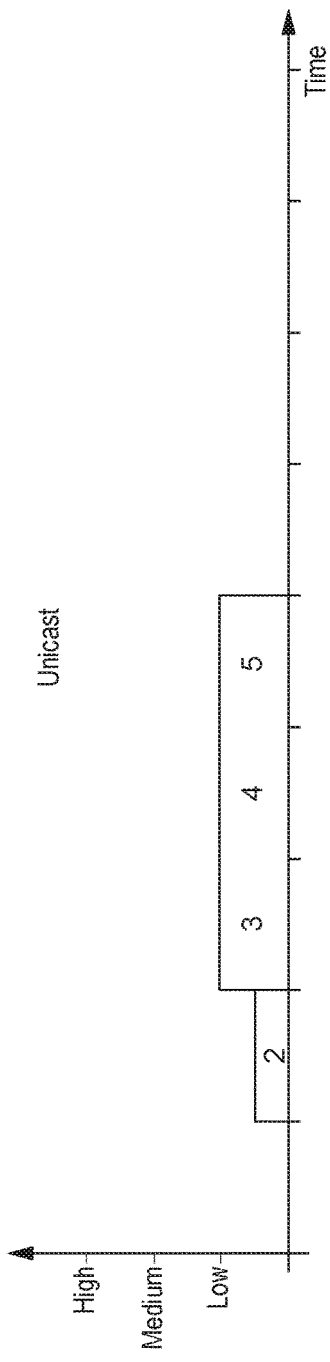
FIG. 12: shows a unicast request used when switching as in FIG. 11.
Figure 13:
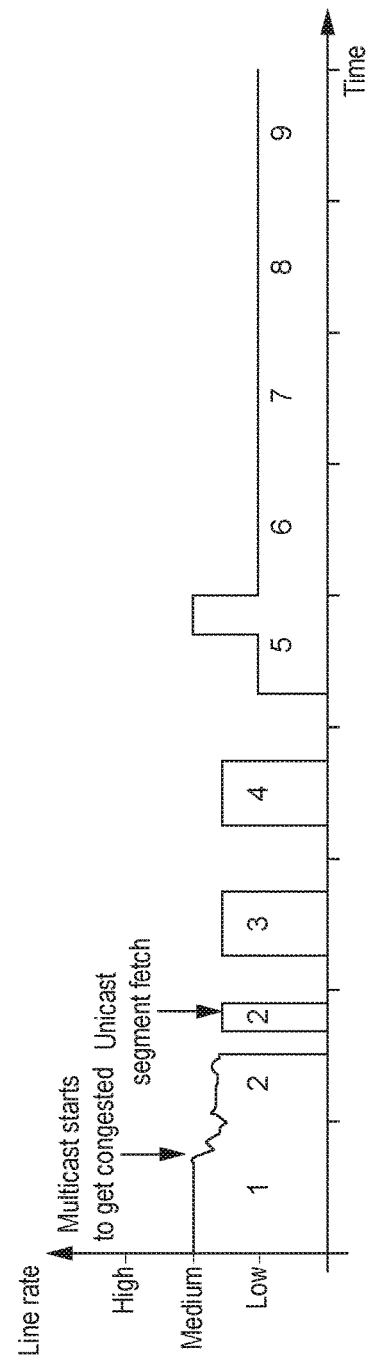
FIG. 13: illustrates the bit rate generated during the unicast fetching of FIG. 12.

The process of changing from a higher quality representation to a lower quality Representation (and therefore lower bit rate) is shown in FIGS. 12 and 13. Again, the Representation selector 27 of the Client Proxy 8 may determine that network conditions are such that the currently received multicast transmission cannot be adequately received at a sufficient rate or without errors. The Representation selector may therefore determine to subscribe to a lower quality multicast stream. Changing down to a lower bit rate Representation is therefore triggered by matters such as reduced network capacity (i.e. congestion) or increased error rate. This is indicated by the jagged region on the left of FIG. 13. As such, any incomplete Segment cannot be completed by multicast at the required quality and, in extreme circumstances, it may not even be possible to fill in the missing portions of the Segment by the required deadline using a unicast patch. To meet the deadline of Segment availability in the Segment Cache, the Client Proxy may therefore request a Segment from a much lower bit rate Representation in a burst (note the lower bit rate Representation indicated by Segment 2 in FIG. 12, and the burst rate delivery of the same Segment in FIG. 13).

The system preferably would not allow the Representation to reach such a mismatched state with the available network bit rate, instead reacting earlier to drop down to a lower rate Representation, and to repeat this step until the system settles to a minimum of unicast usage. Using this approach should avoid the need for a unicast request for a Segment of lower than desired quality.

Also note in FIG. 13 how the unicast fetching of Segment 5 (the final in-fill Segment delivered by unicast before the multicast stream takes over) can potentially overlap with the discarded RTP Segments of Segment 5 (FIG. 11) to create a peak of line rate well above the lower bit rate of the next selected Representation.

The process of changing from a high quality to a lower quality multicast representation may therefore be summarised as determining within the Client Proxy that the current representation being received cannot be sustained due to prevailing network conditions, issuing a request to cease reception of one representation and issuing a request to join a lower bit rate Representation, determining whether complete segments of the new Representation have been received, and issuing a unicast request from the Client Proxy for any segments that are not completely received between leaving one multicast stream and joining the new multicast stream.

Termination of a Media Presentation

There is no explicit signal specified by MPEG DASH to terminate a media presentation session: the client simply stops requesting Segments from the DASH Server and this implicitly marks the end of the session. The DASM Client Proxy 8 must therefore employ suitable heuristics to determine that a particular Decoder 17 no longer wishes to continue a media presentation session, for example by recording the time of the most recent unicast Segment request from the Decoder. After a suitable period of client inactivity has been passed in relation to a media presentation (the "timeout period"), the Multicast receiver 23 may safely unsubscribe from any multicast streams and stop requesting Segments from the DASH Server 4. If more than one Decoder is consuming the same media presentation at the same time, all active sessions relating to the same MPD must achieve this timeout period before the presentation can be terminated by the Client Proxy.

Implementation of the DASM Head-End

The DASM Head-end is a converter that issues unicast requests for content and makes these available via multicast to the network. Referring again briefly to FIG. 1, the server side converter in the form of the DASM Head-end 6, as previously described, comprises a modified DASH Client 13 that requests by unicast requests content from a server 4 and presents these as RTP multicast packets to a network 12. One implementation of this Head-end is described below.

Figure 14:
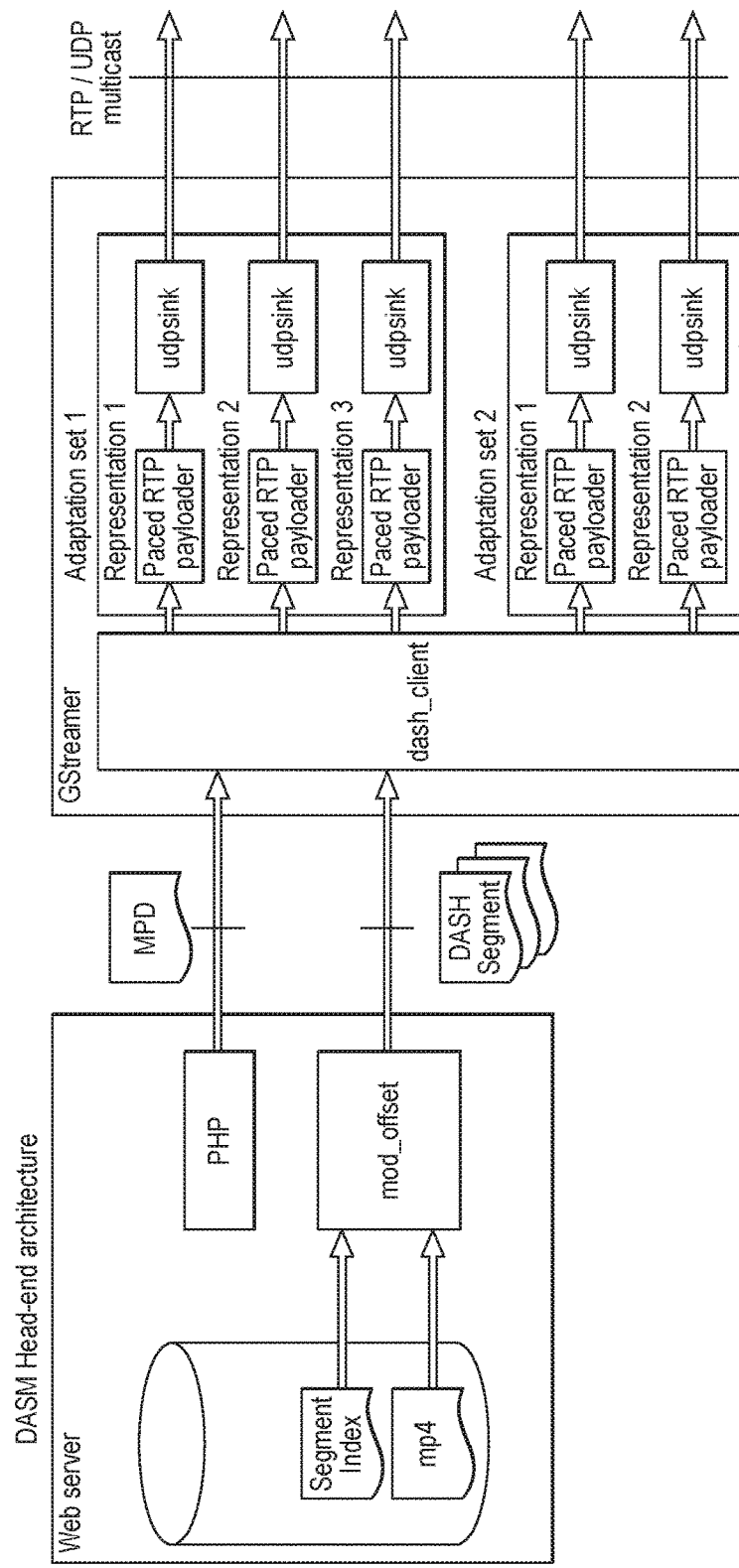
FIG. 14: is a schematic diagram of the server side converter of FIG. 1.

The embodying DASM Head-end is based on the GStreamer open source media framework. A custom GStreamer module called "dash_client", based on the "dash-demux" module, implements a simple DASH Client function. This module reads an MPD resource and creates an internal media pipeline for every Representation listed for each Adaptation Set in the current Period. The head-end re-reads the MPD towards the end of the current period and adjusts the number of pipelines to match the next period if there has been a change. FIG. 14 illustrates an example media presentation session with a video Adaptation Set comprising three encoded Representations and an audio Adaptation Set comprising two Representations. This results in dash_client creating a total of five GStreamer media pipelines.

Each media pipeline is responsible for fetching DASH Segments for the appropriate Representation, fragmenting them into RTP packet payloads, and providing a regulated stream of UDP datagrams to a network socket with the corresponding multicast destination IP address and destination port number. The multicast endpoint addressing information for each Representation is then inserted into the original MPD as shown in FIG. 2 (using DASM extensions to the MPD XML schema) and this extended MPD is then published via an HTTP server. (This could be the same HTTP server as the DASH Server, for example.)

The "pacing" out of the RTP packets is achieved by taking the Duration attribute of the Segment (signalled in the MPD) and dividing the total size of the Segment by the maximum RTP payload size allowed by the network. The resulting number of RTP packets is then spread evenly in time across the Segment's intended Duration, thereby minimising the overall burstiness of the multicast transmission.

Operation of the DASM Client Proxy

An embodiment of the DASM Client Proxy 8 described in relation to FIG. 3 has been designed using UML object-oriented techniques and implemented using the Python programming language.

The operation of the Client Proxy 8 will now be described in relation to the message diagram shown in FIG. 4. This diagram shows the flow of messages from a Decoder 17 that is requesting content from an Origin Server shown here as Origin Server 4. For ease of describing the message flow, it is noted that FIG. 4 shows the components in the opposite order to the remaining figures with the Client Decoder 17 shown on the left and the Origin Server 4 shown on the right so that requests travel from left to right and responses from the Origin Server travel from right to left. The Head-end 6 is omitted altogether from FIG. 4.

First of all the Decoder 17 requests an MPD and this request 40 is intercepted by the DASM Client Proxy 8 which then makes the request for the MPD to the DASH Server 4 on behalf of the Decoder. If the received MPD contains multicast endpoint addressing information then it is re-written into a "single bit rate-agnostic Representation per Adaptation Set format" by the MPD re-writer 21 and this "thinned" version 42 is returned to the decoder. As a side-effect of this MPD "thinning" the Representation-to-multicast mapping 51 is stored in the DASM Client Proxy. Otherwise, if there are no multicast endpoints, then the MPD is returned unmodified to the decoder.

The Decoder 17 will only ever see one MPD per request and will therefore be able to seamlessly operate in On-demand or Live profile mode without modification. The Multicast receiver 22 selects the appropriate starting multicast stream 44 to subscribe to, based upon prior knowledge of the network condition 45 and an estimate of a sustainable low error rate and contention-free bit rate. The Client Proxy issues an IGMP Join message for each Representation that it joins (one for each Adaptation Set selected for presentation). This IGMP request is sent to the local gateway router which, in turn, sets up the route to receive the multicast stream.

The Client Proxy fetches whole DASH Segments via unicast 46 until it receives an RTP packet with the extension header bit set, indicating the start of a sequence of packets containing a whole DASH Segment.

The Client Proxy's Multicast receiver module 22 is responsible for reassembling the received RTP packets into the original DASH Segment. If any packets are missed or corrupted, a byte range HTTP GET request 47 is issued to patch the hole in reception.

The complete DASH Segment is passed to the HTTP Proxy 20 where it is stored in a Segment Cache, available to be fetched by the Decoder using a conventional unicast HTTP GET 49.

The Client Proxy then evaluates if the network conditions are still appropriate to the currently received multicast Representation stream. If yes, the process continues to reassemble DASH Segments from RTP packets. If no, then it issues an IGMP Leave request to the local router, and an IGMP Join for the more appropriate (higher or lower bit rate) multicast Representation stream. The Client Proxy then fetches DASH Segments via unicast HTTP GET 46 until it receives an RTP packet 44 containing the start of a DASH Segment (and repeats the process above).

Underpinning the Client Proxy design is a clock pulse (the Segment Clock) driven by the time at which the next DASH Segment must be delivered to the Decoder for presentation. In other words, based on the Duration attribute of each Adaptation Set, there is a delivery deadline and this drives the decision-making of the Client Proxy, including whether to complete a Segment using unicast, or additionally as an input to the Representation change algorithms. There is one Segment Clock for each Adaptation Set.

Deserialiser

Referring to FIG. 3, the Deserialiser 24 is the Multicast receiver module responsible for opening a network socket, subscribing to the multicast stream, collecting the received RTP packets, re-assembling them into the original DASH Segment 29 and placing the same into the Segment Cache of the HTTP Proxy 20. The Deserialiser also initiates requests to the Segment patcher module 25 to issue unicast HTTP GET byte-range requests for patching the missing portions of any missed or erroneous RTP packets. The Deserialiser also initiates requests to the Unicast fetch control module 19 when a Segment has not been received by the deadline set by the Segment Clock. The missing Segment is retrieved directly from the DASH Server 4 by the Unicast segment fetcher 26.

The Deserialiser issues notification events when it receives an RTP packet with the start markers in the headers, an RTP packet with the end marker in the headers or when it issues a byte-range HTTP-GET request (to signify to statistic gathering modules when it has encountered an error). This information is used by the Network monitoring module 28 described below.

Network Monitoring

The Client Proxy 8 monitors prevailing network conditions using a network monitoring module 28 (shown in FIG.

3) so as to determine the appropriate Representation to select. The operation of this network monitoring will now be described.

The Network monitoring module collects statistics on reception rates for TCP and UDP packets, as well as error rates on RTP reception (via the Deserialiser events described above). The module monitors the prevailing network conditions, such as packet loss and bit rate, taking as many network statistics as possible from both the operating system logs and from functional blocks within the DASM Client Proxy itself. The Network monitoring module outputs a "network forecast" to the Representation selector 27 that will take decisions on the appropriate apportioning of the predicted bit rate among the required Adaptation Sets.

Possible inputs to the Network monitoring module include statistics from the operating system network stack, such as the rate of packet loss and anything to do with bit error rate. Both recent history and long-term trends may be useful in this context. Additional inputs could include packet reception statistics from the Deserialiser such as packet loss rate, the bit rate measured for unicast Segment fetching and patching, and the size and frequency of those patches.

As well as making these raw statistics available, the Network monitoring module also exposes an aggregated network condition summary in the form of a predicted network bit rate.

By keeping a record of what bit rate is achieved in particular daily timeslots (for example during mid-morning when contention will be at its lowest, 3-5 pm when children have returned home or the traditional evening peak from 7 pm onwards) the Client Proxy can make an estimate "from cold" of what is the most likely rate. This is particularly useful for estimating the achievable bit rate when switching up Representations.

Representation Selector

The principal function performed by the Representation selector module 27 is to determine the highest bit rate multicast stream that can be received from the DASM head-end Server 6 without appreciable packet loss. As has already been explained, the embodiment overcomes the problem of having no direct control over Quality of Service within the network layer by observing the network behaviour and reacting to it.

The Representation selector module is preferably operable to implement a configurable algorithm that selects an appropriate Representation based on prevailing network conditions. By facilitating experimentation with a plurality of Representation selection strategies, this design approach enables the performance of different algorithms to be compared side-by-side under controlled network test conditions and the best ones selected for deployment.

The configurable algorithm is preferably modular in the sense that the algorithm can be easily replaced, such as by downloading a new algorithm to the Client Proxy. A particular example of this would be to implement the Client Proxy in a set-top box and provide the ability to remotely install updated Representation selection algorithms to the set-top box.

The goal of the Representation selector is to maximise the audio/video quality presented to the viewer within the constraints of the available bit rate, while at the same time minimising the frequency of changes of Representation and the size of the gap between selected Representations so the viewer doesn't perceive sudden and regular changes in audio/video quality.

Practical operation of the DASM system indicates that a better viewing experience is achieved by smaller incremental changes to Representation than big leaps in quality. Furthermore, we have appreciated some incremental changes between Representation may be perceived by the viewer to be "big" particularly if they involve an increase or decrease in video resolution, or between stereo and 5.1 audio; minimising such leaps may usefully be factored into the decisions about the speed of moving up and down Representations.

The inputs to the Representation selector include notifications received from other modules in the Client Proxy in the form of asynchronous events, most notably:
  Bit rate Change Event received from the Network monitoring module, indicating changes in network bit rate. The calculation of this takes into account UDP datagram rates of receipt for all currently subscribed multicast groups, and TCP throughput rate for unicast fetching and unicast patching.
  Deserialiser Event received from the Deserialiser module, indicating reception time for RTP packets, and the size and frequency of packet loss.

The Representation selector is also to poll the Network monitoring module to find out the current estimated bit rate for the Client Proxy as a whole or to determine the average measured bit rate across a specified time window (given in parameters).

Additionally, the Representation selector module can discover the Representations available in the current Period for each Adaptation set.

Considerations in Designing a Representation Selection Algorithm

Some considerations in the decision-making process of the Representation selection algorithm are next described.

From the inputs available there are two sets of statistics: firstly, packet loss statistics averaged across both a time period and their frequency characteristics (lost contiguous "bursty" blocks of data or regular/random patterns). Secondly, average bit rate statistics across a defined time window (stored as an internal value e.g. "window of interest").

These are more negative than positive feedback responses and signify when the current Representation is too high for the current network characteristics. The case where there is capacity for a higher bit rate Representation is more difficult to predict and may involve exploratory incremental increases in bit rate usage, for example, pushing upwards until a correlated packet loss is noted. An alternative is to use the strategies pre-existing within DASH clients to predict an increase in network bandwidth availability.

Figure 15:
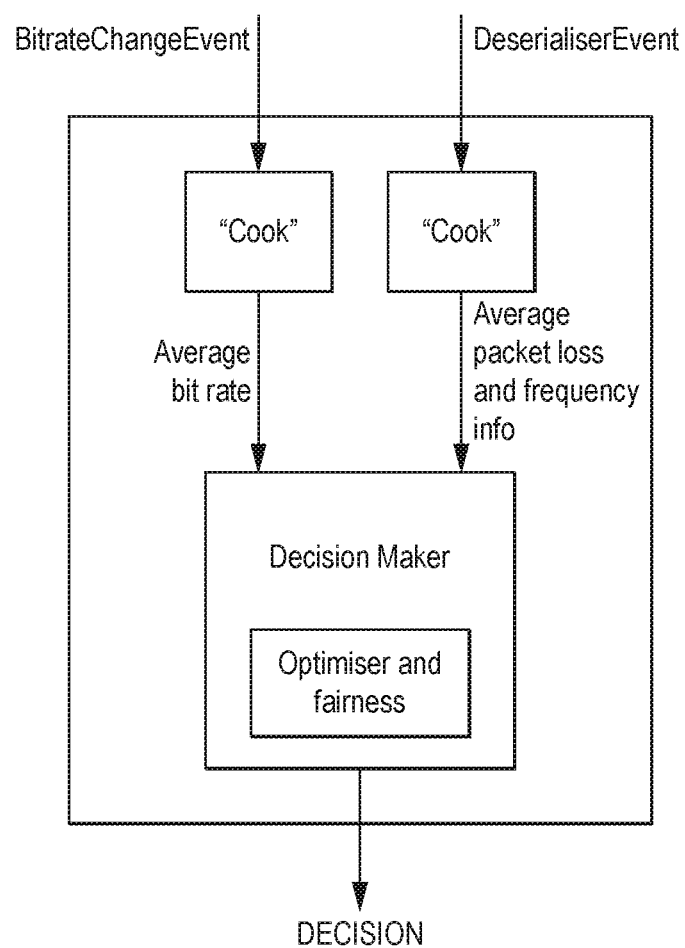
FIG. 15: summarises collecting and processing the bit rate data and packet loss data for switching decisions.

FIG. 15 summarises an approach to collecting and processing the bit rate data and packet loss data through two different processing engines and feeding the processed data into a decision maker. As such, it illustrates the generalised schematic for a Representation selection algorithm. The decision maker should include optimisation and fairness processing to ensure equitable sharing of available bit rate between the selected Adaptation Sets and stability functions (e.g. hysteresis) to prevent the system changing up and down between Representations too rapidly or too aggressively.

By deriving the average rate, frequency and size of multicast packet loss from the raw statistics at its disposal, the Representation selection algorithm may deduce whether packet loss is occurring in contiguous blocks (from interfering data connections running in parallel on the same link) or in a more random fashion. This could indicate differing network characteristics: some network congestion (the block loss) may be temporary, for example, and it might not be appropriate to change Representation to cope, with the loss being covered by unicast patching/fetching.

The decision to change Representation is made separately for each Adaptation Set but note that in practice all Adaptation Sets are competing for the same capacity in the delivery network. As well as deciding if the total bit rate available has changed, the decision maker also therefore needs to apportion the bit rate between Adaptation Sets. This could be achieved via a linear scale or could involve some weighting towards, for example, better audio quality than video quality.

An additional benefit of de-coupling the audio and video Representation changes is that small incremental increases in audio (or even video if there is sufficient granularity between Representation bit rates) could be used to "test the water" and see by experimentation if there is capacity to increase bit rate.

If there is more than one media presentation session simultaneously active, the Representation selector must also ensure fairness when apportioning the available bit rate between these active sessions. In deployments supporting large numbers of media presentation sessions simultaneously the Client Proxy may, for example, rely on the unicast fetching mechanism for sessions with small numbers of clients, reserving the multicast reception mode for sessions with larger numbers of clients.

This concept of a client session threshold may be useful in networks where multicast transmission capacity is limited.

Description of Appendices

Figure 16:
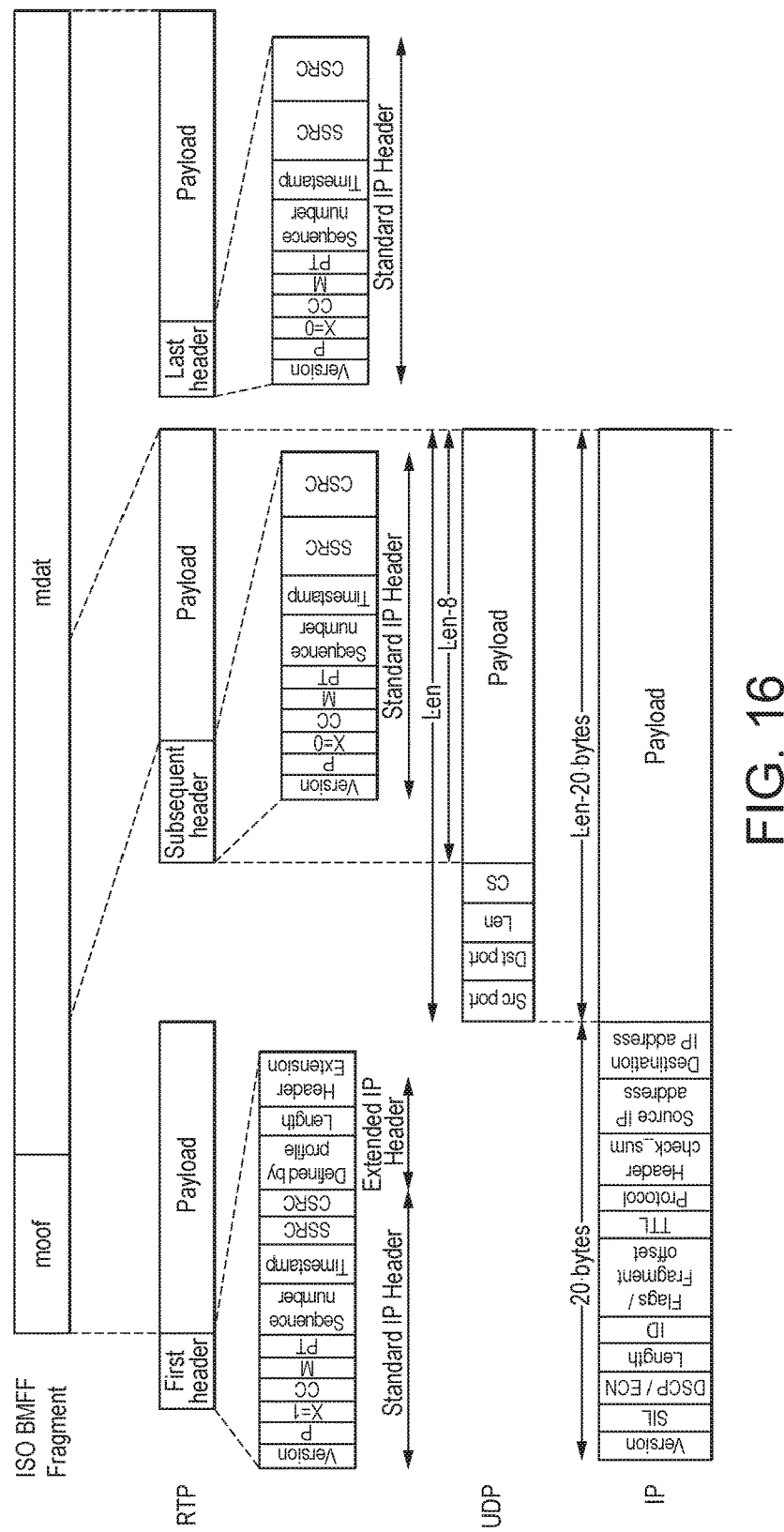
FIG. 16: shows an example RTP payload format.

Specific examples of the protocols used are described in relation to Appendix A and Appendix B, along with FIG. 16 of the figures. Appendix A describes the RTP Payload. Appendix B describes MPD Rewriting Rules. These are both particular non-limiting examples that may be used in embodiments of the invention.

APPENDIX A

An RTP Payload Format for Streaming Mpeg Dash Segments and ISO BMFF Fragments

The RTP payload format described is this Appendix specifies how ISO Base Media File Format (BMFF) fragments formatted as MPEG DASH Segments are to be further decomposed and mapped directly into RTP data packets. The payload format is built on the "RTP audio video profile (RTP/AVP)" described in [IETF RFC 3551] which is a profile of the generic Real-time Transport Protocol specified in [IETF RFC 3550]. The payload format specified herein adopts concepts from other similar RTP/AVP payload formats, such as [IETF RFC 3016], the payload format for MPEG-4 audio-visual streams.

Use of RTP Header Fields for ISO BMFF Fragment Payload

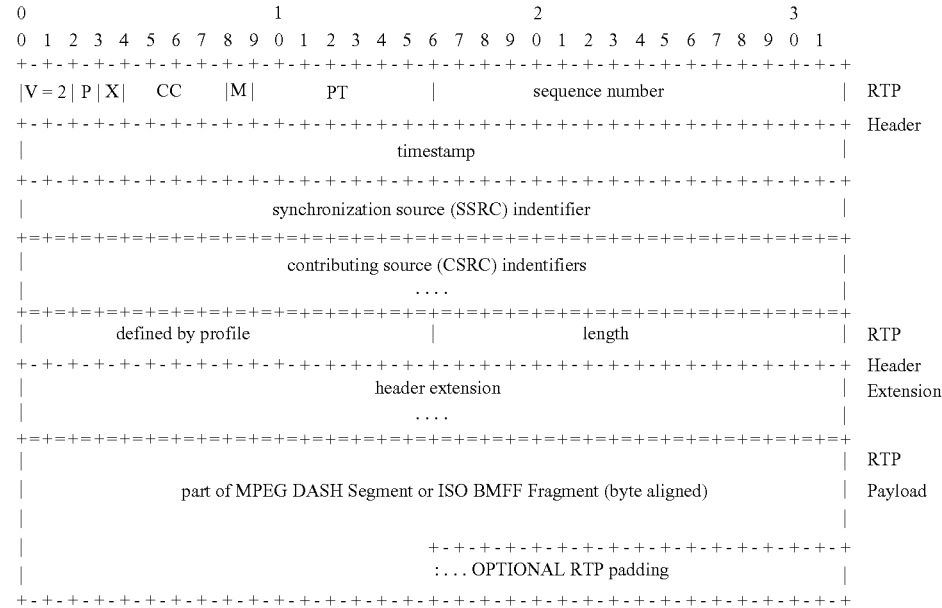

Extension (X) bit: set to 1 to indicate the first (or only) RTP data packet of a particular ISO BMFF Fragment or MPEG DASH Segment. If set to 1, the optional RTP Header Extension SHALL be present in the data packet. Otherwise set to 0 and the optional RTP Header Extension SHALL NOT be present.

Contributing sources count (CC): always set to 0000.

Marker (M) bit: The marker bit is set to 1 to indicate the last (or only) RTP data packet of a particular ISO BMFF Fragment or DASH Segment.

Payload Type (PT): a payload type value in the dynamic range 96-127 shall be allocated per [IETF RFC 3551 Section 3]. (The value used must be signalled to the client out of band, e.g. in an SDP resource or equivalent.)

Sequence Number (16 bits): Incremented by one for each RTP data packet sent from a given Synchronisation Source, starting at a random value and wrapping back to 0 after 65535.

Timestamp (32 bits): indicates the encoding timestamp of the first frame in the DASH Segment being transmitted. This will be the same for each RTP data packet arising from a particular source Segment. The resolution of the timestamp shall be 1 Hz, measured in seconds since midnight UTC on 1970-01-01. (The resolution of the timestamp shall be signalled out of band, e.g. in an SDP resource or equivalent.)

Synchronization Source (SSRC) identifier: a randomly allocated 32-bit unsigned value.

Contributing Source (CSRC) identifiers: shall not be present.

The use of the optional RTP header extension is specified below.

Indicating the First RTP Data Packet in an ISO BMFF Fragment

The extension bit X SHALL be 1 indicating the presence of the RTP header extension.

The RTP Header Extension shall be present and the fragment-byte-count extension element shall indicate the length of the ISO BMFF Fragment.

The data from the ISO BMFF Fragment shall follow immediately in the RTP Payload field.

Indicating the First RTP Data Packet in an MPEG DASH Segment

In the more specific case of an MPEG DASH Segment, further information needs to be carried in order to reconstruct and re-reference the content with the fragment URL. This information SHALL be present in the first RTP data packet arising from each MPEG DASH Segment. The information SHALL be conveyed in the RTP header extension as specified by [IETF RFC 3500].

The header extension bit X SHALL be 1 indicating the presence of the RTP header extension.

The RTP header extension SHALL be present and formatted as specified in [IETF RFC 5285]. The two-byte header specified in [IETF RFC 5285 Section 4.3] SHALL be used to populate the "defined by profile" field:

```
 0                   1
 0 1 2 3 4 5 6 7 8 9 0 1 2 3 4 5
+-+-+-+-+-+-+-+-+-+-+-+-+-+-+-+-+
|         0x100         | appbits |
+-+-+-+-+-+-+-+-+-+-+-+-+-+-+-+-+
```

The appbits field is not used and shall be set to 0x0.

The RTP Header length field SHALL indicate the total number of 32-bit words of header extension data that follow (i.e. excluding the "defined by profile" and "length" fields).

Where the data in the RTP header extension is not an exact multiple of 32-bit words, it SHALL be extended to the nearest word boundary using padding bytes with the value 0. Any padding bytes added for this reason SHALL be included in the RTP Header length value.

Each extension element starts with a byte containing an ID and a byte containing a length:

```
 0                   1
 0 1 2 3 4 5 6 7 8 9 0 1 2 3 4 5
+-+-+-+-+-+-+-+-+-+-+-+-+-+-+-+-+
|       ID      |     length    |
+-+-+-+-+-+-+-+-+-+-+-+-+-+-+-+-+
```

The 8-bit length field is the length of extension data in bytes, excluding the ID and length fields and excluding any padding bytes that follow the extension element. A length value of 0 indicates there is no data following, in which case the extension element plays the role of a two-byte marker tag with no additional information.

Extension Elements

The following table specifies the extension elements defined by this Payload Format. Note that the extension element URI (indicated in the first column of the table) does not appear directly in the RTP data stream: extension elements are indicated in the stream solely using their local identifier (indicated in the second column). The mapping between local identifiers and URIs is achieved using an out-of-band mechanism. If the media session is described using an [IETF RFC 4566] session description, the extmap attribute specified in [IETF RFC 5285] SHALL be used for this purpose using the following syntax:

a=extmap:<value>["/"<direction>]
<URI><extensionattributes>

[IETF RFC 5285] specifies that these mappings may appear separately for each media stream (MPEG DASH Representation) described by the session, or globally for all media streams in the session (MPEG DASH Presentation), but both approaches may not be mixed in the same session description.

| Extension element URI | Extension element local identifier | Description | Value specification |
|---|---|---|---|
| http://bbc.co.uk/refdata/rtp-hdrext/iso-bmff#fragment-byte-count | 1 | ISO BMFF Fragment Byte Count | Variable length unsigned integer indicating the length (in bytes) of the ISO BMFF Fragment. The size of the length integer is signalled in the header field L. |
| http://bbc.co.uk/refdata/rtp-hdrext/mpeg-dash#segment-id | 2 | DASH Segment Identifier | Variable length string identifier encoded as ASCII printable characters. |
| http://bbc.co.uk/refdata/rtp-hdrext/mpeg-dash#segment-base-url | 3 | DASH Segment Base URL | Variable length string encoded as ASCII printable characters. Fully-qualified URL including protocol part. |
| http://bbc.co.uk/refdata/rtp-hdrext/mpeg-dash#segment-relative-url | 4 | DASH Segment Relative URL | Variable length string encoded as ASCII printable characters. Relative URL. |

Worked Example

The following example illustrates an RTP data packet that includes the optional RTP header extension because its payload contains the start of a new MPEG DASH Segment. The marker bit X is therefore set to 1.

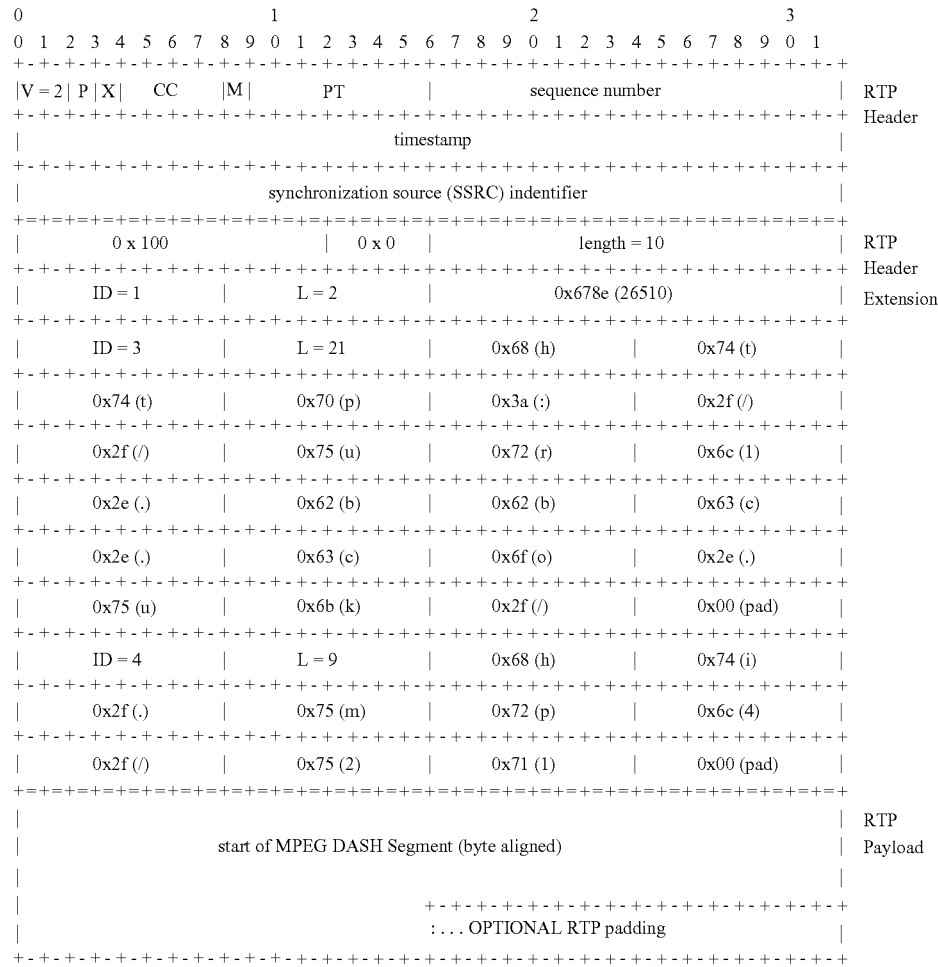

The RTP Header Extension is 10 words (40 bytes) in length (length=10). It follows immediately after the SSRC field because no CSRC identifiers are permitted. The RTP Header Extension contains three extension elements, as follows:

1. fragment-byte-count (ID=1). The length of the MPEG DASH Segment (ISO BMFF Fragment) in this particular example (26510 bytes) can be expressed as a two-byte unsigned integer, and so L=2 and the Segment length value follows in the next two bytes.
2. segment-base-url (ID=3). The base URL of the MPEG DASH Segment (http://url.bbc.co.uk/) is 21 bytes long. An extra padding byte with value 0 is appended to align the field with the next word boundary, but this padding is not included in the extension element length field (L=21).
3. segment-relative-url (ID=4). The relative URL of the MPEG DASH Segment (hi.mp4/21) is 9 bytes long. An extra padding byte with value 0 is appended to align the field with the next word boundary, but this padding is not included in the extension element length field (L=9).

The associated session description would contain mappings for the above three extension elements as follows:

```
a=extmap:1/sendonly
  http://bbc.co.uk/refdata/rtp-hdrext/iso-bmff#fragment-byte-count
a=extmap:3/sendonly
  http://bbc.co.uk/refdata/rtp-hdrext/mpeg-dash#segment-base-url
a=extmap:4/sendonly
  http://bbc.co.uk/refdata/rtp-hdrext/mpeg-dash#segment-relative-url
```

Indicating the Final RTP Data Packet in an MPEG DASH Segment or ISO BMFF Fragment In the final RTP datagram of the sequence corresponding to a particular MPEG DASH Segment or ISO BMFF Fragment, the marker (M) bit SHALL be set to 1 to indicate the end of the sequence.

APPENDIX B

B MFD re-writing rules

| | Data type in MPD spec | Cardinality in MPD spec | Recipe | Notes |
|---|---|---|---|---|
| //MPD | Element | M | Maintain unchanged | |
| //MPD[@profiles] | string | M | Maintain unchanged | |
| //MPD[@type] | string | OD (default="static") | Maintain unchanged, but if static reject and return MPD unchanged | |
| //MPD[@minBufferTime] | string | M | Maintain unchanged | |
| //MPD[@minimumUpdatePeriod] | string | O | Maintain unchanged or absent | |
| //MPD[@availabilityStartTime] | string | CM (must be present for "dynamic") | Change by adding an offset which is a (configurable) multiple of the longest Segment duration from all Adaptation Sets | |
| //MPD[@timeShiftingBufferDepth] | string | O | Maintain unchanged or absent | This effects proxy cache policy |
| //MPD/BaseURL | Element | O | Remove element | |
| //MPD/Period/ | Element | M | Maintain unchanged | Pass through all periods |
| //MPD/Period/[@start] | string | O | Maintain unchanged or absent | |
| //MPD/Period/[@duration] | string | O | Maintain unchanged or absent | |
| //MPD/Period/BaseURL | Element | O | Remove element | |
| //MPD/Period/AdaptationSet | Element | M | Maintain unchanged | |
| //MPD/Period/AdaptationSet[@id] | integer | O | Maintain unchanged, but reject if absent and return MPD unchanged | Is this true (review our design) |
| //MPD/Period/AdaptationSet[@lang] | string | O | Maintain unchanged or absent | |
| //MPD/Period/AdaptationSet[@SegmentAlignment] | string | OD (default="false") | If absent or set to "false" return MPD unchanged, else maintain unchanged Set/change to "false" | |
| //MPD/Period/AdaptationSet[@bitstreamSwitching] | string | O | Maintain unchanged or absent | |
| //MPD/Period/AdaptationSet[@width] | int | O | Maintain unchanged or absent | |
| //MPD/Period/AdaptationSet[@height] | int | O | Maintain unchanged or absent | |
| //MPD/Period/AdaptationSet[@sar] | string | O | Maintain unchanged or absent | |
| //MPD/Period/AdaptationSet[@frameRate] | string | O | Maintain unchanged or absent | |
| //MPD/Period/AdaptationSet[@audioSamplingRate] | string | O | Maintain unchanged or absent | |
| //MPD/Period/AdaptationSet[@mimeType] | string | M (mandatory in either Adaptation Set of Representation) | Maintain unchanged or absent | |
| //MPD/Period/AdaptationSet[@codecs] | string | O | Maintain unchanged or absent | |
| //MPD/Period/AdaptationSet[@scanType] | string | O | Maintain unchanged or absent | |
| //MPD/Period/AdaptationSet[@startWithSAP] | integer | O (values 0 to 6) | Maintain unchanged or absent | |
| //MPD/Period/AdaptationSet/BaseURL | Element | O | change domain name to "dasm.local" and insert a session ID as a path element into the URL:http//dasm.local/<sha1 of MPD URL>/<period start time>/<Adaptation set id>/ | |
| //MPD/Period/AdaptationSet/SegmentTemplate | Element | M | Maintain unchanged or add | all |

-continued

| | | B MFD re-writing rules | | |
|---|---|---|---|---|
| | Data type in MPD spec | Cardinality in MPD spec | Recipe | Notes |
| //MPD/Period/AdaptationSet/SegmentTemplate[@duration] | int | O | Maintain unchanged or inherit from Representation | Representations must have the same duration and timescale |
| //MPD/Period/AdaptationSet/SegmentTemplate[@timescale] | int | O | Maintain unchanged or inherit from Representation | |
| //MPD/Period/AdaptationSet/SegmentTemplate[@media] | string | O | Change to media="$Number$" | |
| //MPD/Period/AdaptationSet/SegmentTemplate[@initialization] | string | O | Change to initialization="$Number$" | |
| //MPD/Period/AdaptationSet/SegmentTemplate[@startNumber] | int | O | Maintain unchanged | |
| //MPD/Period/AdaptationSet/Representation/SegmentTemplate | Element | M | Remove element | |
| //MPD/Period/AdaptationSet/Representation/SegmentTemplate[@duration] | int | O | Remove | |
| //MPD/Period/AdaptationSet/Representation/SegmentTemplate[@timescale] | int | O | Remove | |
| //MPD/Period/AdaptationSet/Representation/SegmentTemplate[@media] | string | O | Remove | |
| //MPD/Period/AdaptationSet/Representation/SegmentTemplate[@initialization] | string | O | Remove | |
| //MPD/Period/AdaptationSet/Representation/SegmentTemplate[@startNumber] | int | O | Remove | |
| //MPD/Period/AdaptationSet/Representation | Element | O | Remove all existing Representations and replace with a new generic Representation | |
| //MPD/Period/AdaptationSet/Representation[@id] | string | O | Insert a new Representation ID | |
| //MPD/Period/AdaptationSet/Representation[@bandwidth] | int | M | Average of all Representations in this Adaption set | |
| //MPD/Period/AdaptationSet/Representation[@width] | int | O | If common to all Representations, promote to Adaptation Set element, otherwise remove | The optional attributes can only be present in either the Adaptation Set or the Representation but not both. The only mandatory one is mimeType which must be present in Adaptation Set or Representation. |
| //MPD/Period/AdaptationSet/Representation[@height] | int | O | If common to all Representations, promote to Adaptation Set element, otherwise remove | |
| //MPD/Period/AdaptationSet/Representation[@sar] | string | O | If common to all Representations, promote to Adaptation Set element, otherwise remove | |
| //MPD/Period/AdaptationSet/Representation[@frameRate] | string | O | If common to all Representations, promote to Adaptation Set element, otherwise remove | |
| //MPD/Period/AdaptationSet/Representation[@audioSamplingRate] | string | O | If common to all Representations, promote to Adaptation Set element, otherwise remove | |
| //MPD/Period/AdaptationSet/Representation[@mimeType] | string | M (mandatory in either Adaptation Set or Representation | Maintain unchanged or absent | |
| //MPD/Period/AdaptationSet/Representation[@codecs] | string | O | If common to all Representations, promote to Adaptation Set element, otherwise remove | |
| //MPD/Period/AdaptationSet/Representation[@startWithSAP] | string | O | If common to all Representations, promote to Adaptation Set element, otherwise remove | |
| //MPD/Period/AdaptationSet/Representation[@scanType] | string | O | If common to all Representations, promote to Adaptation Set element, otherwise remove | |
| //MPD/Period/AdaptationSet/Representation/EndpointList/ | Element | O | Removed, and values written to MulticastConfiguration | |

-continued

B MFD re-writing rules

| | Data type in MPD spec | Cardinality in MPD spec | Recipe | Notes |
|---|---|---|---|---|
| //MPD/Period/AdaptationSet/Representation/EndpointList/EndpointAddress | Element | M | Removed, and values written to MulticastConfiguration | Mandatory if parent EndpointList is present (at least one address per EndpointList) |
| //MPD/Period/AdaptationSet/Representation/BaseURL | Element | O | Remove element | |

Cardinality key for attributes:
M = Mandatory,
O = Optional,
OD = Optional with Default Value,
CM = Conditionally Mandatory

The invention claimed is:

1. A system for delivering content at varying qualities from a server to multiple clients across a network, the content being arranged in representations of differing qualities, each representation comprising segments addressable by client requests, comprising:
a Dynamic Adaptive Streaming over Multicast (DASM) head-end arranged to:
issue unicast requests to the server for segments of multiple representations of the content;
convert each of the multiple representations of the content to respective multicast datagram streams, each representation being assigned to a corresponding multicast IP address; and
deliver the multicast datagram streams onto the network;
a DASM client proxy arranged to:
receive requests for content from the clients;
determine a representation of the content to obtain;
subscribe to the multicast datagram stream that comprises the determined representation of the content;
convert the multicast datagram stream back to segments available to the client by unicast request;
intercept client requests for content;
intercept response messages from a server; and
modify the response messages to be sent to the client by altering an address in the response message so that client requests for content are redirected to the DASM client proxy.

2. A system according to claim 1 wherein the modifying comprises altering a description in the response message to present only one representation as apparently available to the client.

3. A system according to claim 1 wherein the response message is a MPEG DASH media presentation description (MPD).

4. A system according to claim 1 wherein the DASM client proxy is arranged to determine the representation of the content to obtain based on monitoring conditions on the network.

5. A system according to claim 1 wherein the DASM client proxy is arranged to minimize perceptible effects of switching between representations by one or more of minimizing the frequency of switching between representations or minimizing the difference in quality of representations when switching between representations.

6. A system according to claim 1 wherein the DASM client proxy is operable to switch between different representations of the content by switching between multicast datagram streams.

7. A system according to claim 1 wherein the DASM client proxy is arranged to determine if any segments reassembled from a multicast datagram stream are incomplete and to retrieve missing portions of such segments.

8. A system according to claim 7 wherein retrieving the missing portions is by requesting one or more ranges of bytes within the incomplete segment.

9. A system according to claim 1 wherein the DASM client proxy is part of a client device or part of a gateway device arranged to provide content to multiple client devices.

10. A system according to claim 1 wherein the DASM client proxy is part of a network provider content delivery system.

11. A system according to claim 1 wherein converting each of the multiple representations of the content to respective multicast datagram streams comprises converting segments to a stream of datagrams.

12. A system according to claim 1 wherein determining a representation of the content to obtain comprises obtaining a representation if the DASM client proxy receives a request for the content from a number of clients that is greater than a threshold.

13. A method for delivering content at varying qualities from a server to multiple clients across a network, the content being arranged in representations of differing qualities, each representation comprising segments addressable by client requests, comprising:
at a server side converter:
issuing unicast requests to the server for segments of multiple representations of the content;
converting each of the multiple representations of the content to respective multicast datagram streams, each representation being assigned to a corresponding multicast IP address; and
deliver the multicast datagram streams onto the network;
at a client side converter:
receiving requests for content from the clients;
determining a representation of the content to obtain;
subscribing to the multicast datagram stream that comprises the determined representation of the content;
converting the multicast datagram stream back to segments available to the client by unicast request;
intercepting client requests for content;
intercepting response messages from a server; and
modifying the response messages to be sent to the client by altering an address in the response message so that client requests for content are redirected to the client side converter.

14. A method according to claim 13, wherein the modifying comprises altering a description in the response message to present only one representation as apparently available to the client.

15. A method according to claim 13 comprising minimizing perceptible effects of switching between representations by one or more of minimizing the frequency of switching between representations or minimizing the difference in quality of representations when switching between representations.

16. A method according to claim 13, comprising determining if any segments are missing when switching between multicast datagram streams and retrieving any such missing segments by issuing a unicast request to the server.

17. A method according to claim 13 comprising determining if any segments reassembled from a multicast datagram stream are incomplete and to retrieve missing portions of such segments.

18. A method according to claim 17, wherein retrieving the missing portions is by requesting one or more ranges of bytes within the incomplete segment.

19. A method according to claim 13 wherein converting each of the multiple representations of the content to respective multicast datagram streams comprises converting segments to a stream of datagrams.

20. A method according to claim 13 wherein determining a representation of the content to obtain comprises obtaining a representation if the client side converter receives a request for the content from a number of clients that is greater than a threshold.

21. A method for delivering content at varying qualities from a server to multiple clients across a network, the content being arranged in representations of differing qualities, each representation comprising segments addressable by client requests, comprising:
- receiving requests for content from the clients;
- determining a representation of the content to obtain;
- subscribing to the multicast datagram stream that comprises the determined representation of the content;
- converting the multicast datagram stream to segments available to the client by unicast request;
- intercepting client requests for content;
- intercepting response messages from a server; and
- modifying the response messages to be sent to the client by altering an address in the response message so that client requests for content are redirected to the client side converter.

* * * * *